(12) United States Patent
Brooks et al.

(10) Patent No.: US 7,798,339 B2
(45) Date of Patent: Sep. 21, 2010

(54) RAIL AND SLIDER SYSTEM

(75) Inventors: Jeffrey S. Brooks, St. Louis, MO (US); Gregory A. Wirtel, St. Louis, MO (US)

(73) Assignee: Funnel Fits L.L.C., St. Louis, MO (US)

( * ) Notice: Subject to any disclaimer, the term of this patent is extended or adjusted under 35 U.S.C. 154(b) by 606 days.

(21) Appl. No.: 11/668,215

(22) Filed: Jan. 29, 2007

(65) Prior Publication Data

US 2008/0180847 A1  Jul. 31, 2008

(51) Int. Cl.
*A47H 1/00* (2006.01)

(52) U.S. Cl. .................. 211/103; 211/190; 211/207

(58) Field of Classification Search ............ 211/103, 211/190, 207, 208, 187, 189; 108/106–108, 108/147.17; 312/408, 306, 312; 248/161, 248/407, 408, 354.6, 354.7
See application file for complete search history.

(56) References Cited

U.S. PATENT DOCUMENTS

| | | | |
|---|---|---|---|
| 152,955 | A | 7/1874 | Scaffolds |
| 277,510 | A | 5/1883 | Roberts |
| 391,438 | A | 10/1888 | Van Horn |
| 427,462 | A * | 5/1890 | Crider ..................... 248/244 |
| 569,640 | A | 10/1896 | Hartzell |
| 723,677 | A | 3/1903 | Kade |
| RE12,140 | E * | 8/1903 | Stahmer ................... 211/27 |
| 984,857 | A | 2/1911 | Schuftan |
| 1,009,679 | A | 11/1911 | McFadden |
| 1,037,915 | A | 9/1912 | Hyde |
| 1,065,045 | A | 6/1913 | Hartmann |
| 1,133,696 | A | 3/1915 | Barbora |
| 2,915,832 | A | 12/1959 | Phillips |
| 2,937,766 | A | 5/1960 | Penn |
| 3,256,658 | A * | 6/1966 | Seery ...................... 52/292 |
| 3,603,274 | A | 9/1971 | Ferdinand |
| 3,765,344 | A * | 10/1973 | Ferdinand et al. ........... 108/108 |
| 3,794,183 | A | 2/1974 | Colbridge |
| 4,203,373 | A | 5/1980 | Conti |
| 4,348,001 | A | 9/1982 | Baldwin |

(Continued)

FOREIGN PATENT DOCUMENTS

WO  2005107536 A2  11/2005

*Primary Examiner*—Janet M Wilkens
*Assistant Examiner*—Dan Rohrhoff
(74) *Attorney, Agent, or Firm*—Senniger Powers LLP

(57) ABSTRACT

In general, this invention is directed to a rail and slider system having residential and commercial organizational applications. In one aspect, the system comprises at least one rail and a slider mounted on the rail for sliding movement along the rail. The rail and slider have teeth which releasably engage with one another for locking the slider at selected positions along the rail. A spring device on the slider urges the slider toward a locked position. The slider is manually movable against the urging of the spring device from its locked position to an unlocked position in which the teeth on the arms and the tracks are disengaged to permit sliding movement of the slider along the rail to a different selected position. Various items can be attached to the slider, e.g., a funnel-shaped holder and shelf bracket. In other aspects, the slider is configured for snap-mounting on the rail, and a kit is provided including at least two rails and sliders, and a template for mounting the rails on a surface such that the rails are in proper position relative to one another.

16 Claims, 27 Drawing Sheets

U.S. PATENT DOCUMENTS

| | | | |
|---|---|---|---|
| 4,349,171 A | 9/1982 | Baldwin | |
| 4,453,641 A | 6/1984 | Rasmussen | |
| 4,614,273 A * | 9/1986 | Ishii | 211/183 |
| 4,811,670 A | 3/1989 | Kolvites | |
| 5,044,508 A * | 9/1991 | Walter | 211/207 |
| 5,615,854 A * | 4/1997 | Nomura et al. | 248/287.1 |
| 5,645,177 A * | 7/1997 | Lin | 211/70.6 |
| 5,921,411 A | 7/1999 | Merl | |
| 6,105,794 A * | 8/2000 | Bauer | 211/94.01 |
| 6,138,583 A | 10/2000 | Mahone | |
| 6,305,557 B1 | 10/2001 | Brooks | |
| 6,349,911 B1 | 2/2002 | Feldpausch | |
| 6,394,404 B1 | 5/2002 | Cyrell | |
| 6,540,093 B1 | 4/2003 | Shumway | |
| 6,591,996 B1 * | 7/2003 | Wu | 211/90.02 |
| 6,776,466 B2 * | 8/2004 | Harvie, III | 312/351 |
| 6,827,320 B2 * | 12/2004 | Yeh | 248/220.22 |
| 7,293,667 B2 * | 11/2007 | Flynn | 211/189 |
| 2005/0145147 A1 * | 7/2005 | Costa et al. | 108/108 |
| 2005/0247653 A1 * | 11/2005 | Brooks | 211/94.01 |
| 2005/0263465 A1 | 12/2005 | Chung | |
| 2006/0076860 A1 * | 4/2006 | Hoss | 312/312 |
| 2007/0095773 A1 * | 5/2007 | Schwerman | 211/187 |

* cited by examiner

FIG. 7
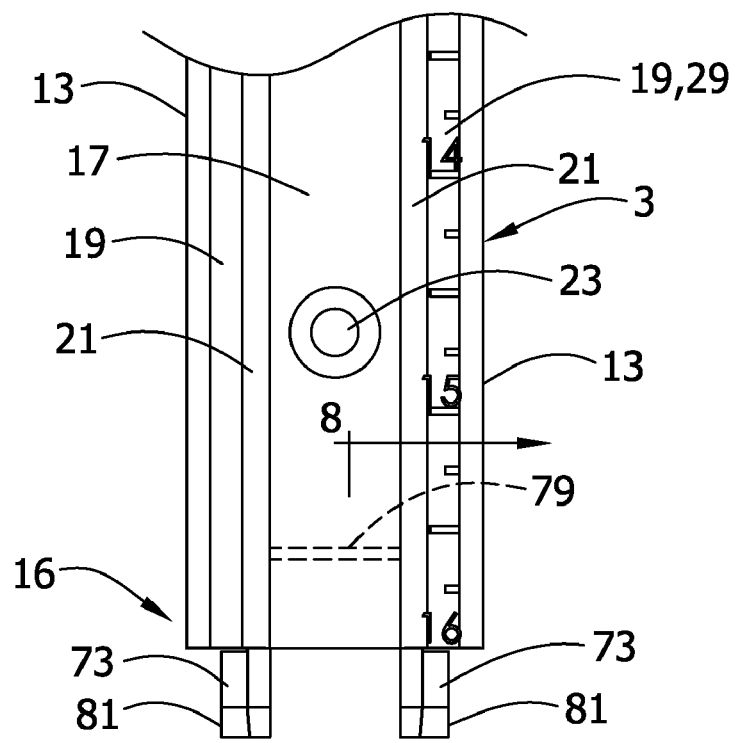
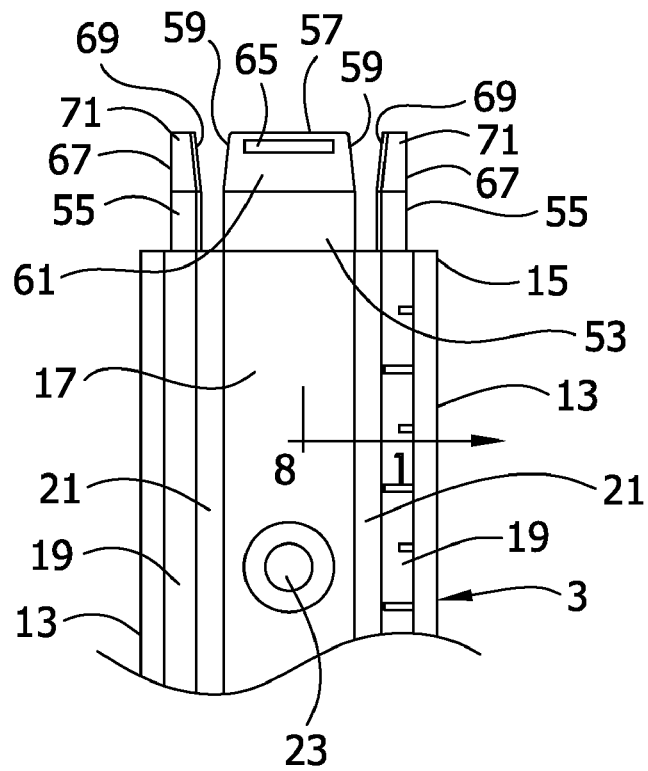

FIG. 8
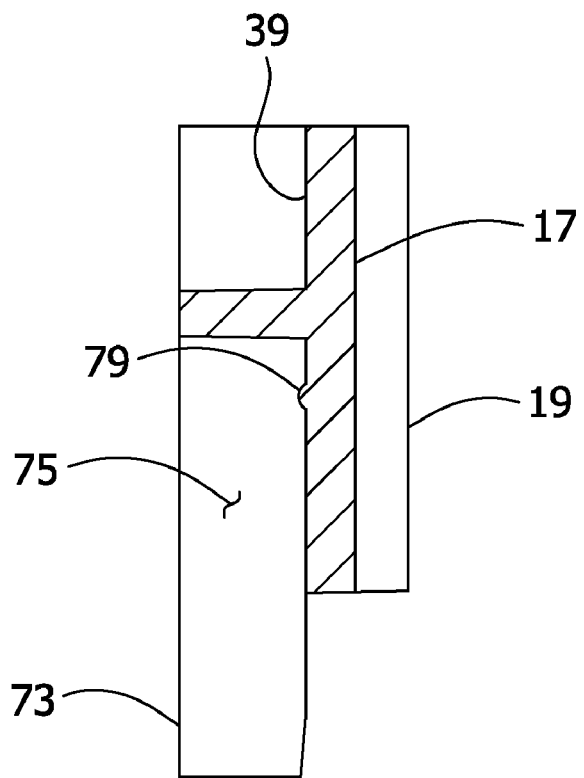
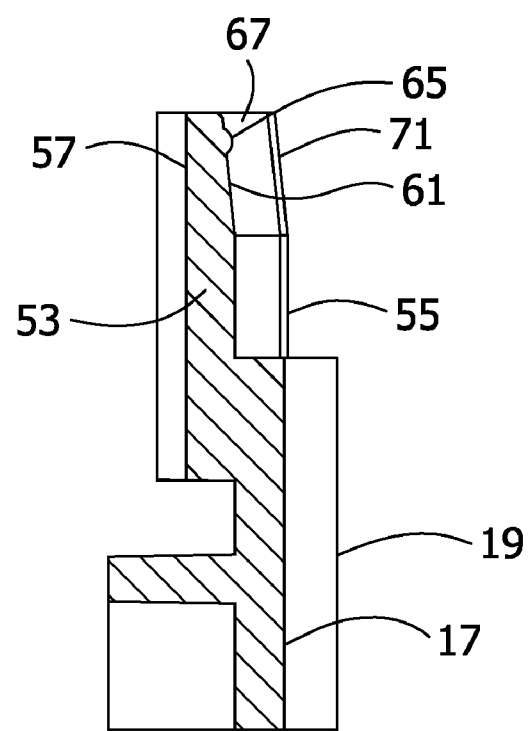

FIG. 12A
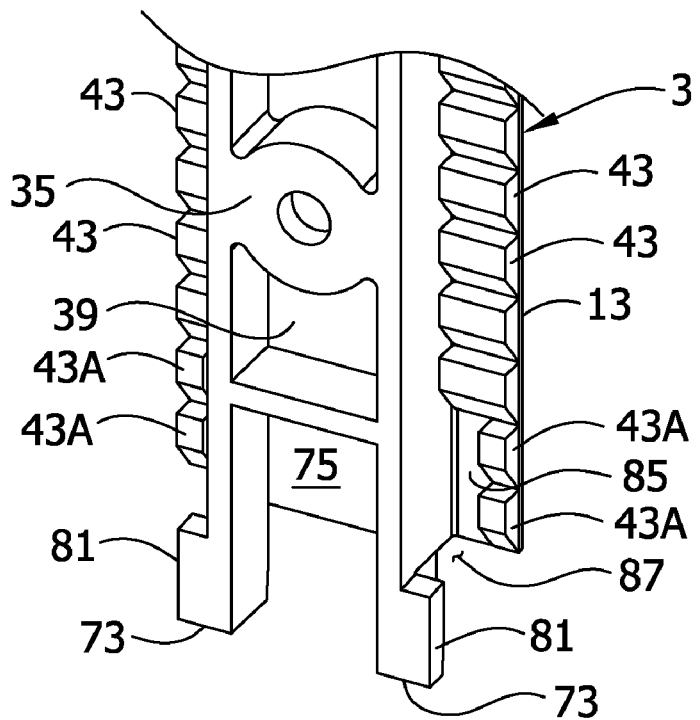
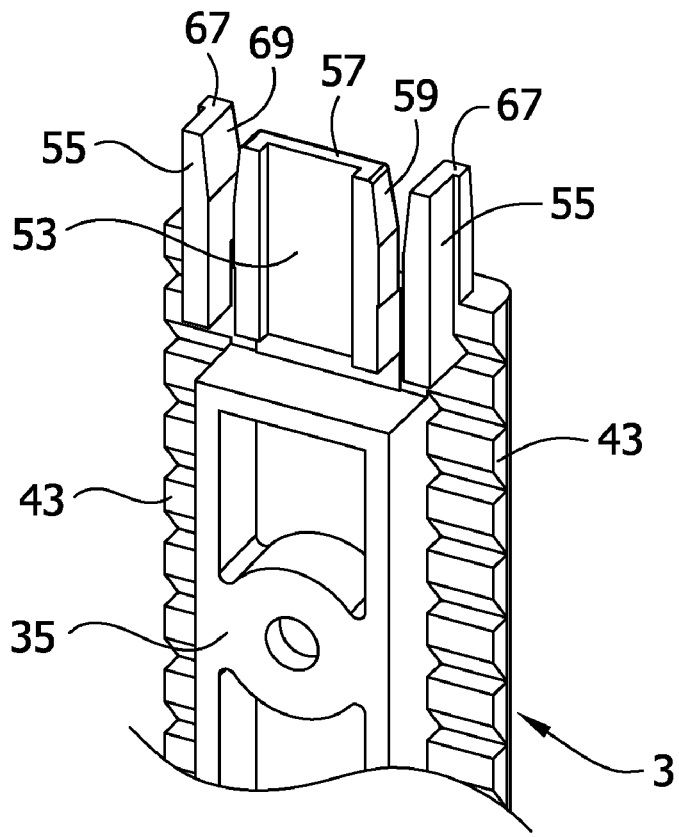

RAIL AND SLIDER SYSTEM

BACKGROUND OF THE INVENTION

This invention relates generally to organizational systems and accessories for organizing living and work spaces.

The organization of garages, basements and work places has driven the demand for organizational systems. Examples of such systems are described in co-assigned U.S. Pat. No. 6,305,557, International Patent Application No. US2005/015955 (Publication No. WO2005/107536), and U.S. patent application Ser. No. 11/104,835 (Publication No. US2005/247653), all three of which are incorporated herein by reference. While these systems have advantages, there is a need for new and improved systems which can be used to meet increasing consumer demand.

SUMMARY OF THE INVENTION

In general, this invention is directed to a rail and slider system having residential and commercial organizational applications. In one aspect, the system comprises at least one rail having a longitudinal axis, a front, a back, opposite sides extending longitudinally of the rail, a top and a bottom. The rail is adapted to be mounted on a wall or other mounting surface with the back of the rail facing the wall. A pair of generally parallel spaced-apart tracks extends longitudinally of the rail adjacent opposite sides of the rail. The tracks have teeth spaced at intervals along the tracks. The system also includes a slider adapted to be mounted on the rail for sliding movement along the rail. The slider comprises a body adapted to be positioned on the front of the rail, at least a first pair of arms at opposite sides of the body having teeth thereon adapted to engage selected teeth on respective tracks of the rail, and a spring device on the body adapted to contact the rail for urging the body and arms of the slider to move toward a locked position in which the teeth on the arms are in engagement with respective teeth on the tracks to lock the slider in a selected position along said rail. The slider body is manually movable against the urging of the spring device from its locked position to an unlocked position in which the teeth on the arms and the tracks are disengaged to permit sliding movement of the slider along the rail to a different selected position. Upon release of the body, the spring device causes the body to move back to its locking position thereby to lock the slider to the rail in the different selected position.

In another aspect, a rail and slider system of this invention comprises at least one rail having a longitudinal axis, a front, a back, opposite sides extending longitudinally of the rail, a top and a bottom. The rail is adapted to be mounted on a wall or other mounting surface with the back of the rail facing the wall. A pair of generally parallel spaced-apart tracks extends longitudinally of the rail adjacent the opposite sides of the rail. The tracks have teeth spaced at intervals along the tracks. The system also includes a slider adapted to be mounted on the rail for sliding movement along the rail. The slider comprises a body adapted to be positioned on the front of the rail, and at least a first pair of arms at opposite sides of the body having teeth thereon adapted to engage selected teeth on respective tracks of the rail. The arms are flexibly resilient for snap-mounting the slider on the rail.

In yet another aspect, this invention is directed to a kit for mounting objects on a wall. The kit comprises first and second rails each having a longitudinal axis, a front, a back, opposite sides extending longitudinally of the rail, a top and a bottom. First and second sliders are adapted to be mounted on respective first and second rails for sliding movement along the rails. The rails and sliders have teeth releasably engageble with one another for locking the sliders at selected positions along respective rails. The kit includes a template for mounting the rails in position relative to one another. The template has recesses for receiving the tops or bottoms of the first and second rails for establishing the proper spacing between the rails and the proper longitudinal positioning of the rails relative to one another.

Other objects and feature will in part apparent and in part pointed out hereinafter.

BRIEF DESCRIPTION OF THE DRAWINGS

FIG. 7 is a fragmentary view showing components on adjacent ends of two rails for releasably connecting the rails;

FIG. 8 is an enlarged vertical section on line 8-8 of FIG. 7;

FIGS. 12A-12C are rear perspectives showing a sequence for connecting the two rails;

Corresponding parts are indicated by corresponding reference numbers throughout the several views of the drawing.

DETAILED DESCRIPTION

Figure 1:
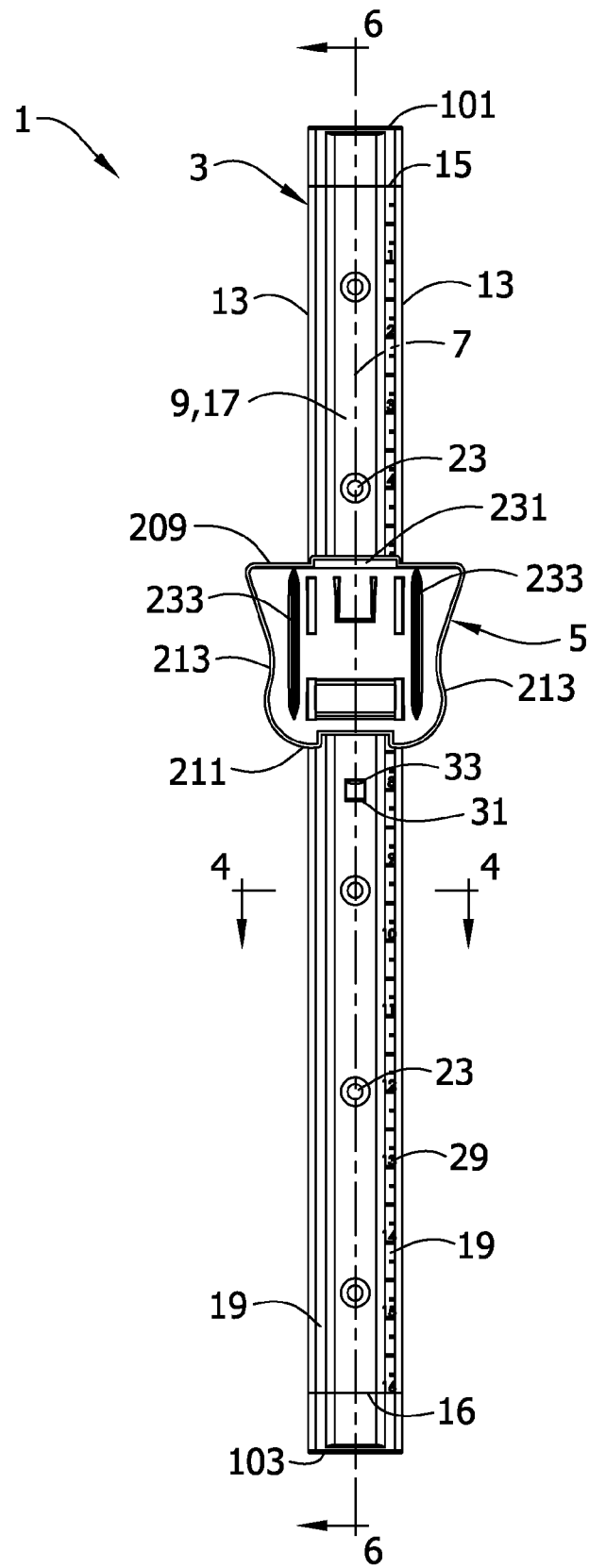
FIG. 1 is a front elevation of a rail and slider of this invention shown mounted on a wall.
Figure 2:
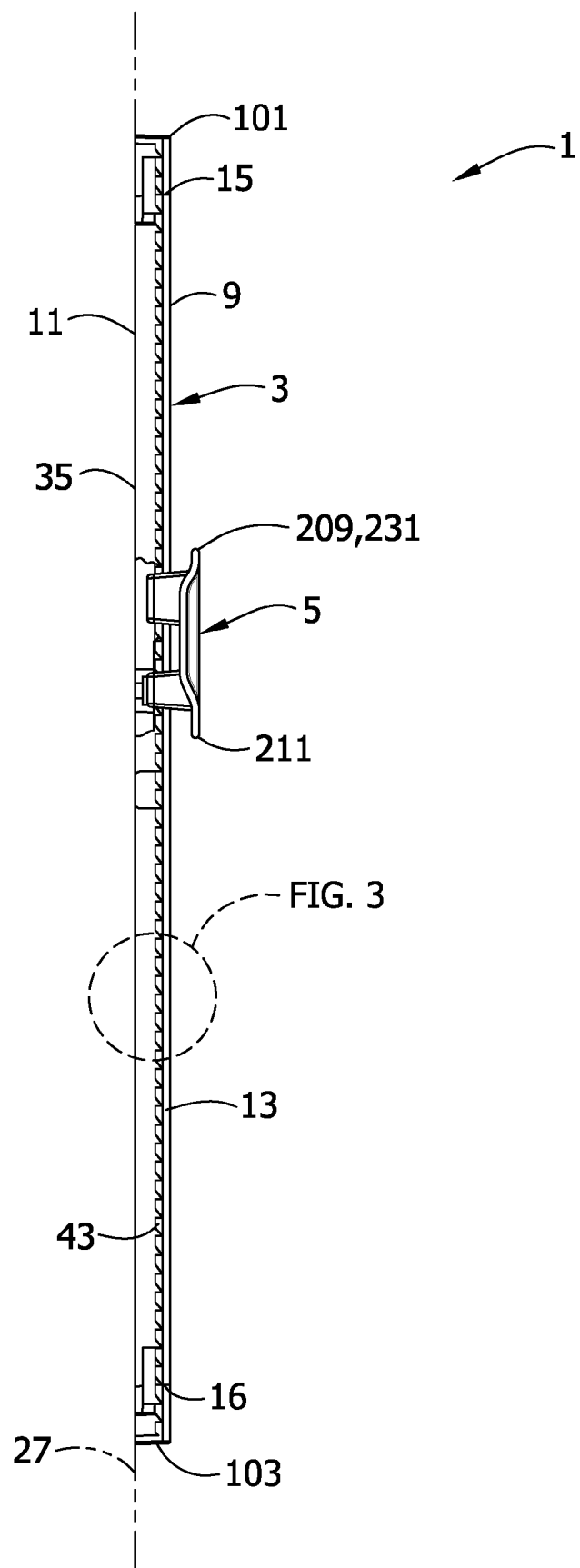
FIG. 2 is a side elevation of the rail and slider of FIG. 1.
Figure 3:
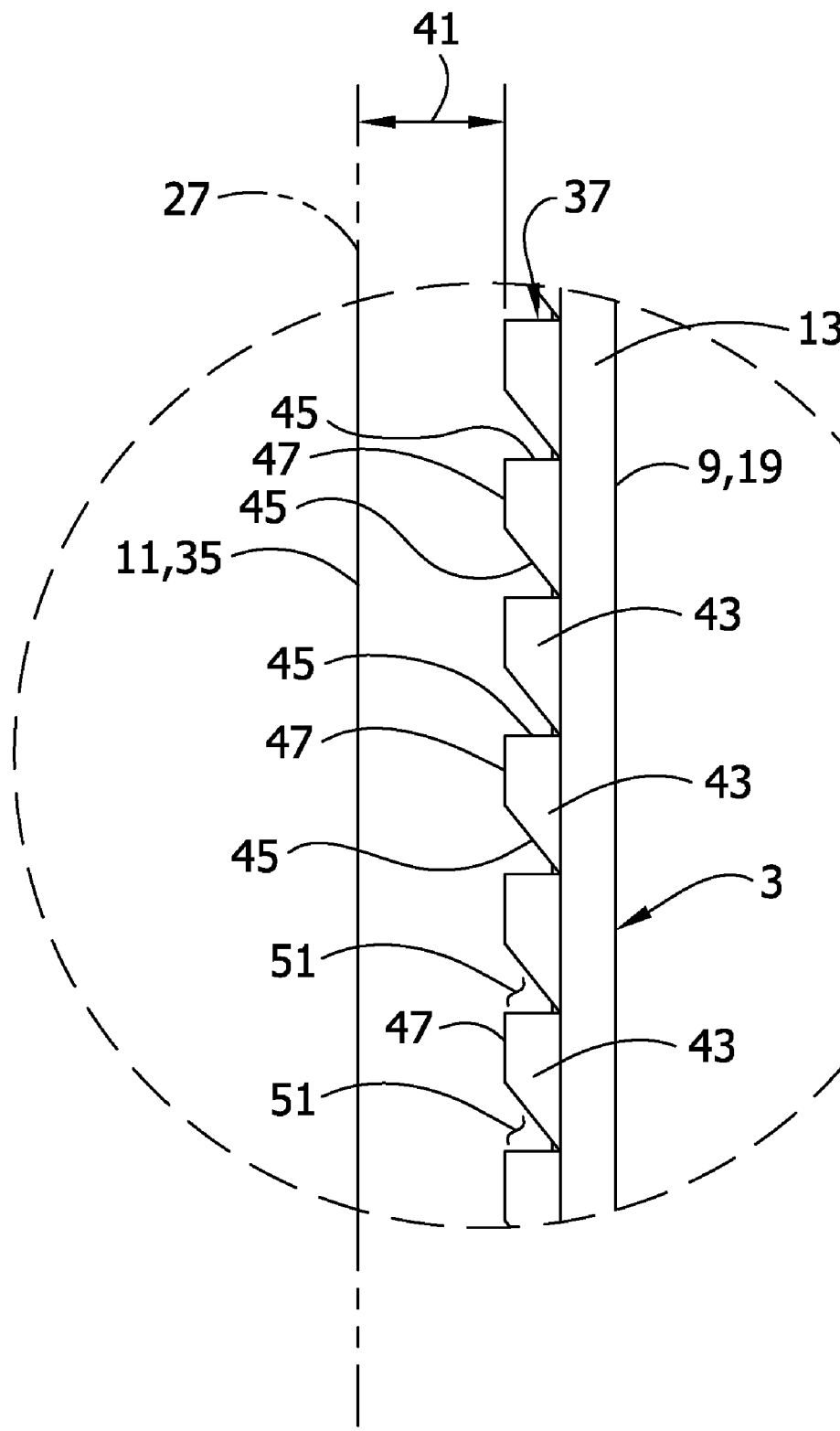
FIG. 3 is an enlarged portion of FIG. 2 showing teeth on the rail.

Referring now to the drawings, and first more particularly to FIGS. 1-3, one embodiment of a rail and slider system of this invention is indicated in its entirety by the reference numeral 1. The system comprises at least one rail, generally designated 3, and at least one slider; generally designated 5, slidable along the rail 3 to a selected position. As described below, the slider 5 and rail 3 have interlocking components for releasably locking the slider 5 in its selected position on the rail 3.

Figure 4:
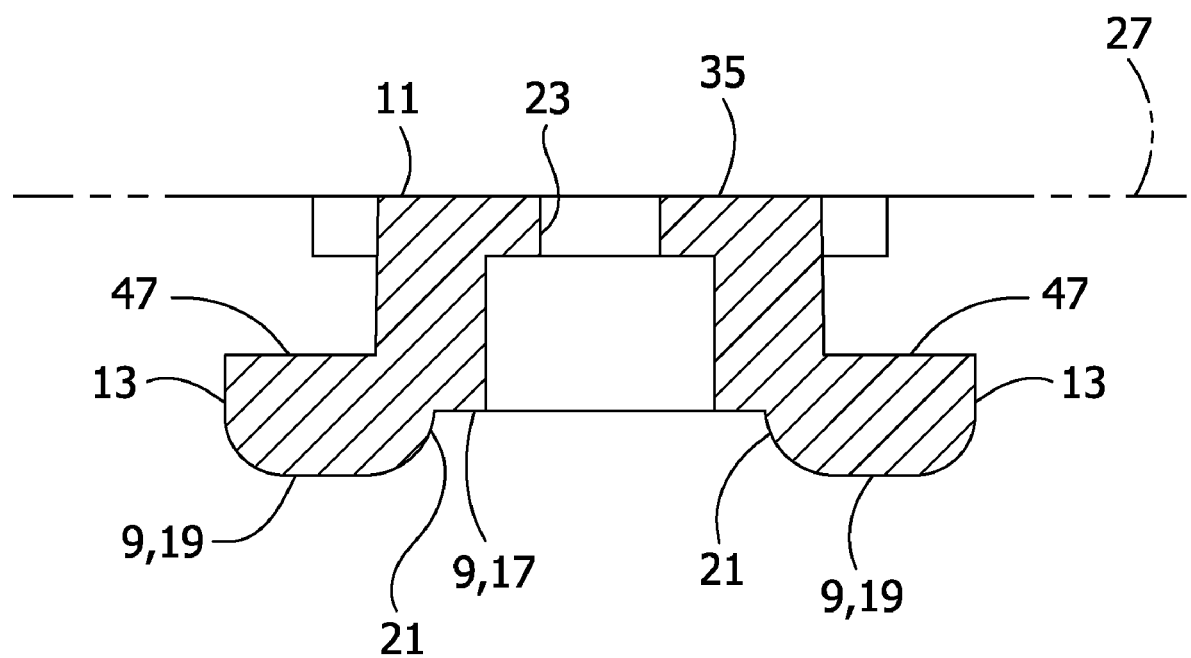
FIG. 4 is an enlarged horizontal section on line 4-4 of FIG. 1.

The rail 3 is an elongate member and may be of one-piece construction fabricated from metal or plastic. By way of example, in one embodiment especially suited for residential use, the rail 3 may be of molded plastic. In other embodiment especially suited for industrial or commercial use, the rail 3 may be stamped or otherwise formed from a suitable metal. Illustrated in FIGS. 1 and 2, the rail 3 has a longitudinal (e.g., vertical) axis 7, a front 9, a back 11, opposite sides 13 extending longitudinally along the rail 3, a top or upper end 15, and a bottom or lower end 16. As shown in FIGS. 1 and 4, the front 9 of the rail 3 has a recessed, generally rectangular front face 17, a pair of shoulders 19 extending the length of the rail 3 at opposite sides 13 of the front face 17, and side walls 21 connecting the recessed front face 17 and the shoulders 19. Fastener openings 23 are spaced at vertical intervals along the rail 3 for receiving fasteners 25 to secure the rail 3 to a wall 27 or other suitable mounting surface with the back of the rail 3 facing the wall 27 (see FIG. 1). The fastener openings 23 are recessed relative to the front face 17 of the rail 3 so as not to interfere with movement of the slider 5 (see FIG. 4). The shoulder 19 of the rail 3 has a vertical measuring scale 29 thereon adjacent one side 13 of the rail 3 (see FIG. 1). A window 31 is provided in the front face 17 of the rail 3 for viewing a level 33 secured to the back 11 of the rail 3 for indicating the orientation of the rail 3 relative to vertical 7.

Figure 5:
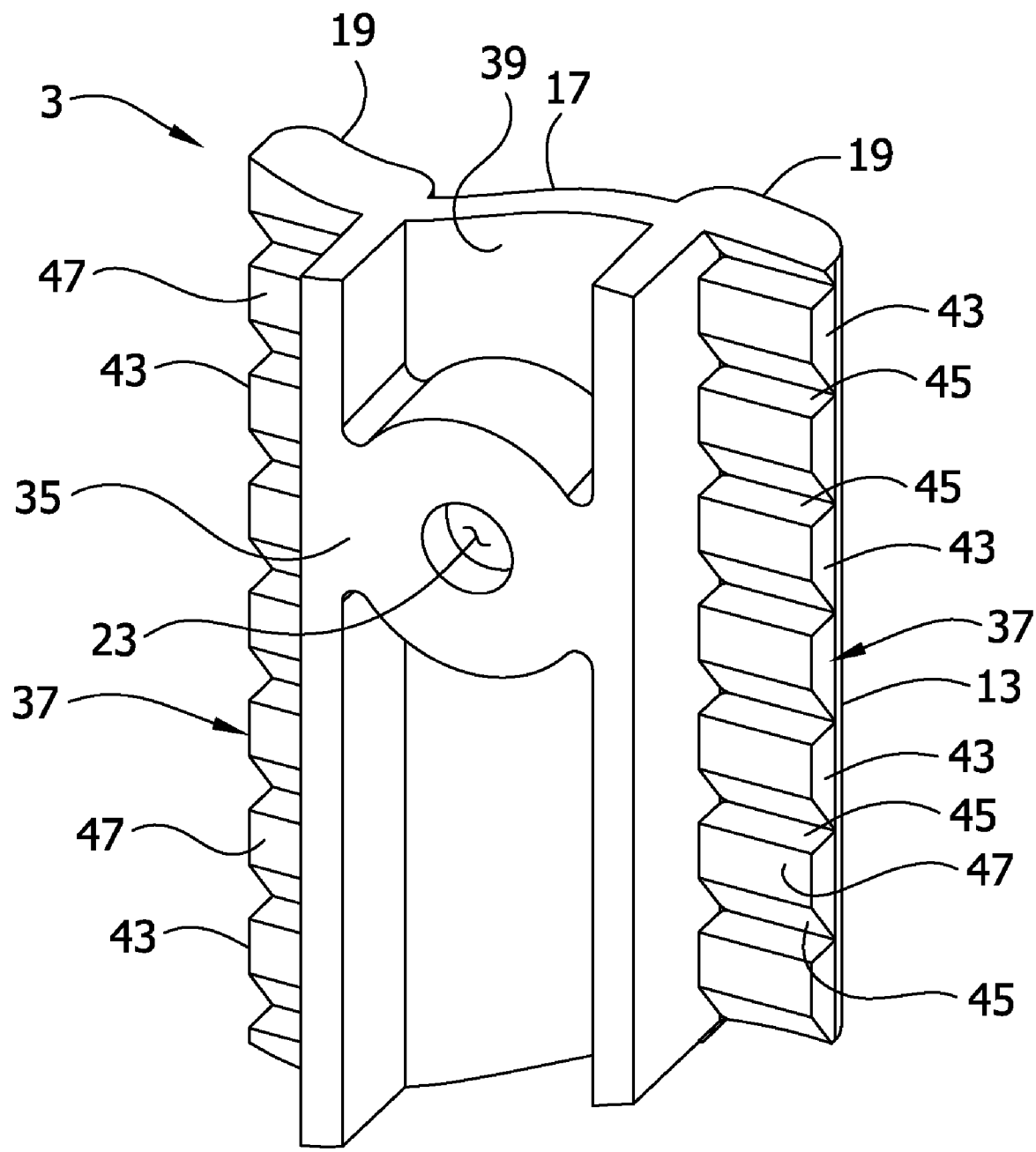
FIG. 5 is a rear perspective of a portion of the rail of FIG. 1.

Referring to FIGS. 3-5, the back 11 of the rail 3 comprises a back face 35 adapted to lie flat against the wall 27 or surface on which the rail 3 is mounted, and a pair of generally parallel spaced-apart tracks 37 extending along the rail on the back 11 of the rail 3 adjacent opposite sides 13 of the rail 3. Portions of the back face 35 are recessed in a forward direction to form an offset back wall indicated at 39. The tracks 37 are offset forward from the back face 35 of the rail 3 to provide a suitable clearance 41 between the tracks 37 and the wall 27 or other mounting surface. The tracks 37 are formed with rearward-facing teeth 43 spaced at regular intervals along each rail 3 from adjacent the top 15 of the rail 3 to adjacent the bottom 16 of the rail 3. Each tooth 43 has opposing side walls 45, preferably tapering to a flat end wall or crown 47, the end walls 47 of the teeth 43 on each track 37 being substantially coplanar. In the particular design of FIG. 3, one side wall 45 of each tooth 43 extends generally at right angles to the end wall 47 and the opposite side wall 45 extends at an obtuse angle relative to the end wall 47, the end result being that adjacent teeth 43 are separated by an asymmetrical notch 51. Other tooth configurations may be used. The center-to-center spacing from one tooth 43 to the next is substantially uniform, although other spacing dimensions are suitable.

Referring to FIGS. 7-12C, the upper 15 and lower ends 16 of the rail 3 are configured for a telescoping fit with a respective end of another rail 3, so that two or more rails 3 can be readily joined to increase the length of the overall rail system 1. The fit between the two telescoping ends 15, 16 is preferably a snap fit and/or press (friction) fit sufficient to maintain the two rails 3 together until they can be fastened to the wall 27 or other surface.

In the specific embodiment best shown in FIGS. 7, 8, 10 and 12A, the upper end 15 of each rail 3 comprises a tongue 53 projecting endwise from the rail 3, and a pair of generally parallel projections 55 protruding endwise from the rail 3 on opposite sides of the tongue 53. The tongue 53 comprises an outer end portion or tip 57 with angled side surfaces 59 and an angled front surface 61 (upper surface as shown in FIG. 8). A detent comprising a rib 65 extends generally transversely with respect to the tongue 53 across its angled front surface 61. Each of the two flanking projections 55 has an end portion or tip 67 with an angled side surface 69 (FIG. 7) and an angled front surface 71 (FIG. 8).

The lower end 16 of each rail 3 comprises a pair of parallel guides 73 projecting endwise from the rail 3. The guides 73 and offset back wall 39 of the rail 3 combine to define a recess 75 which is configured for receiving the tongue 53 of a mating rail 3. As shown in FIG. 8, the offset back wall 39 in this area is formed with a detent comprising a rib 79 extending generally transversely with respect to the recess 75. The guides 73 have lateral extensions 81 projecting outward toward respective sides 13 of the rail 3. As illustrated best in FIG. 12A, the teeth 43A at the end of the rail 3 are reduced in size (length) to provide a pair of shoulders 85 adjacent opposite sides 13 of the rail 3. The two shoulders 85 extend endwise in from the end 16 of the rail 3 at locations inboard of the reduced-size teeth 43A and form guide ways 87 for receiving the projections 55 of a mating rail 3. The lateral extensions 81 of the two guides 73 are located for guiding the projections 55 into respective guide ways 87 to a location where the rib 65 on the tongue 53 of one rail 3 snaps over the rib 79 on the offset back wall 39 of the other rail 3 to releasably lock the two rails 3 end-to-end in a position (FIGS. 9, 10 and 12) where the ends 15, 16 of the two rails 3 are abutting or substantially abutting and the teeth 43, 43A on the two rails 3 form two continuous tracks 37 of teeth 43, 43A with substantially no discontinuities at the juncture of the two rails 3. In this locked position, the recessed front faces 17 of the two rails 3 are generally coplanar and the shoulders 19 on the two rails 3 abut so that a slider 5 can move smoothly over the junction between the two rails 3 (see FIGS. 9 and 10). Preferably, the fit between the tongue 53 and/or projections 55 on one rail 3 and the recesses 75, guides 73 and/or guide ways 87 on the other rail 3 is a friction fit sufficient to assist in holding the two rails 3 together. The angled surfaces 59, 61 on the tongue 53 and projections 55 at the end of one rail 3 facilitate entry of these components into the recess 75 and guide ways 87 of the other rail 3.

Once two rails 3 are connected end-to-end, they can be disconnected by pulling them apart with a force sufficient to cause the tongue 53 to resiliently deflect to permit the ribs 65, 79 on the two rails 3 to move past one another and sufficient to overcome the friction between the projections 55 on one rail 3 and the guides 73 and guide ways 87 on the other rail 3. In this regard, the various mating components of the two rails 3 desirably have some resilience or "spring" to accommodate deviations in tolerance and to allow snap-action between the two detent elements 63, 77 (e.g., ribs 65, 79). Other means for releasable connection of the two rails 3 can be used without departing from the scope of this invention.

Figure 6:
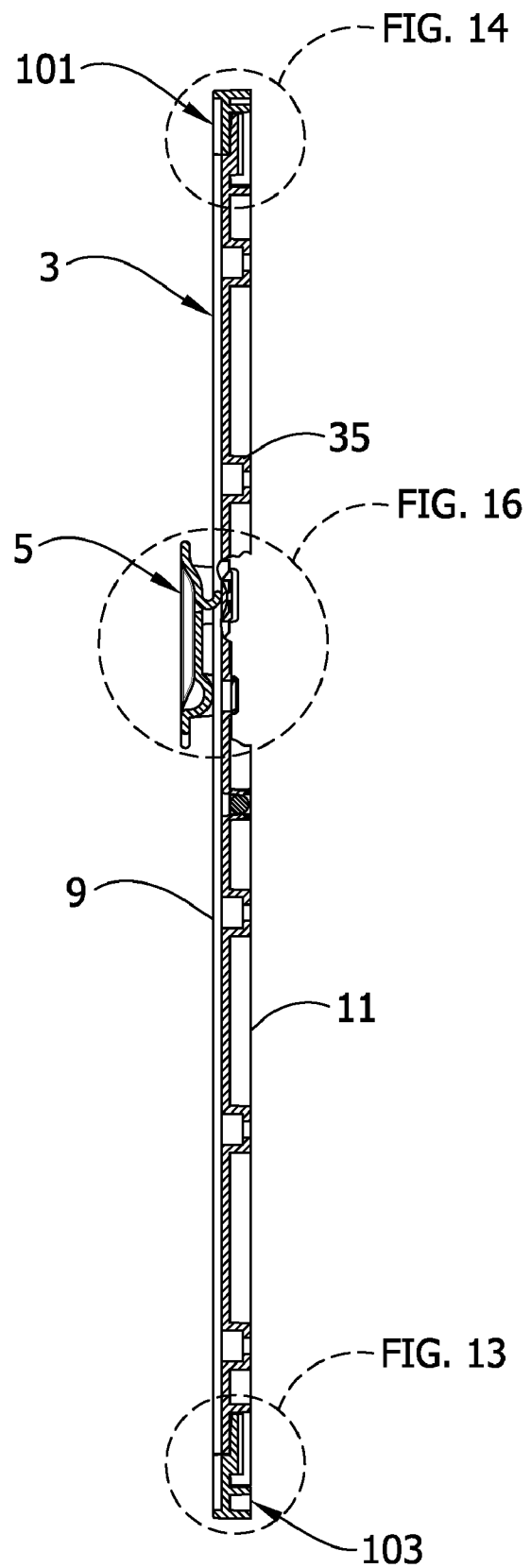
FIG. 6 is a vertical section on line 6-6 of FIG. 1.
Figure 9:
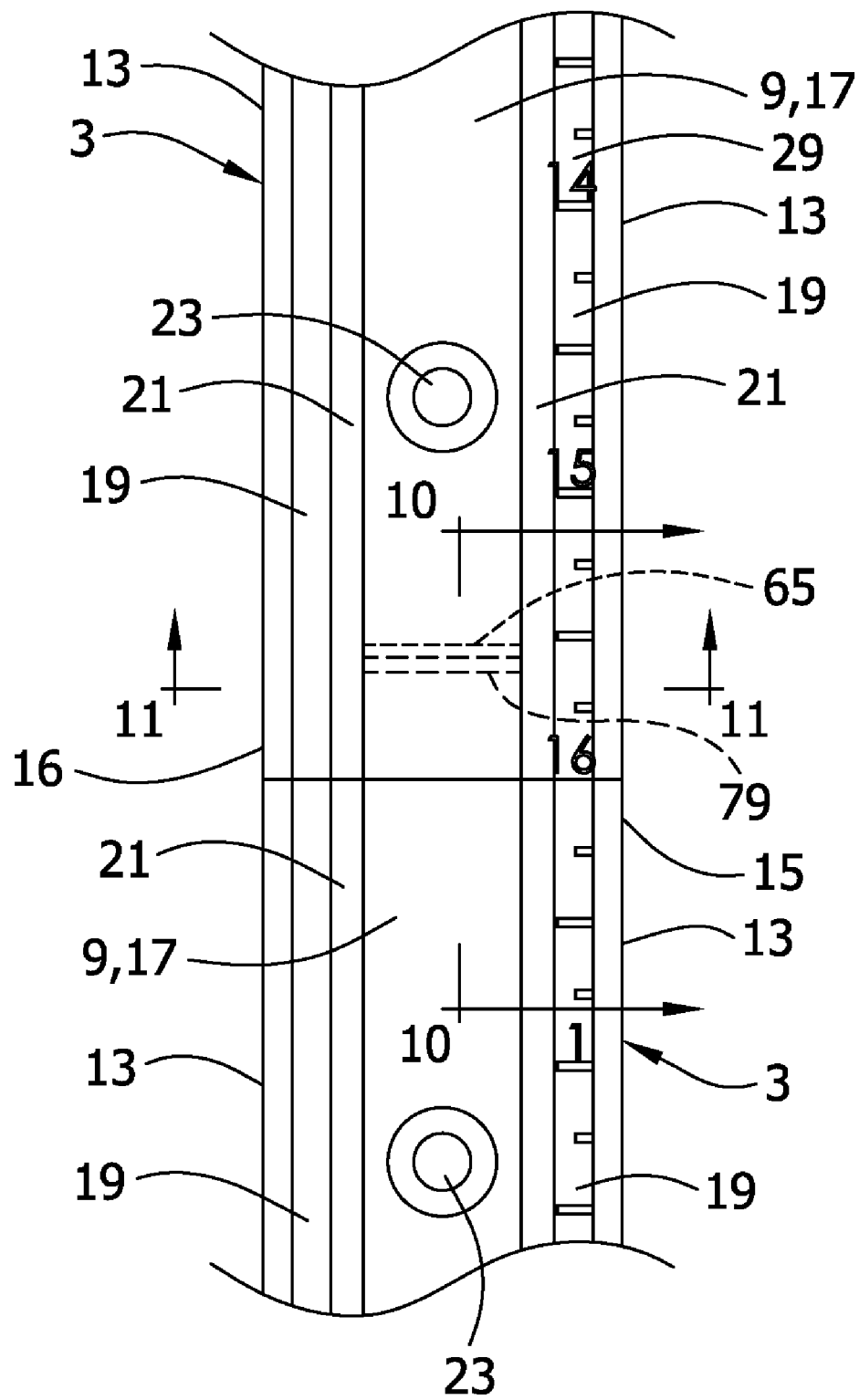
FIG. 9 is a view similar to FIG. 7 but showing the two rails connected.
Figure 10:
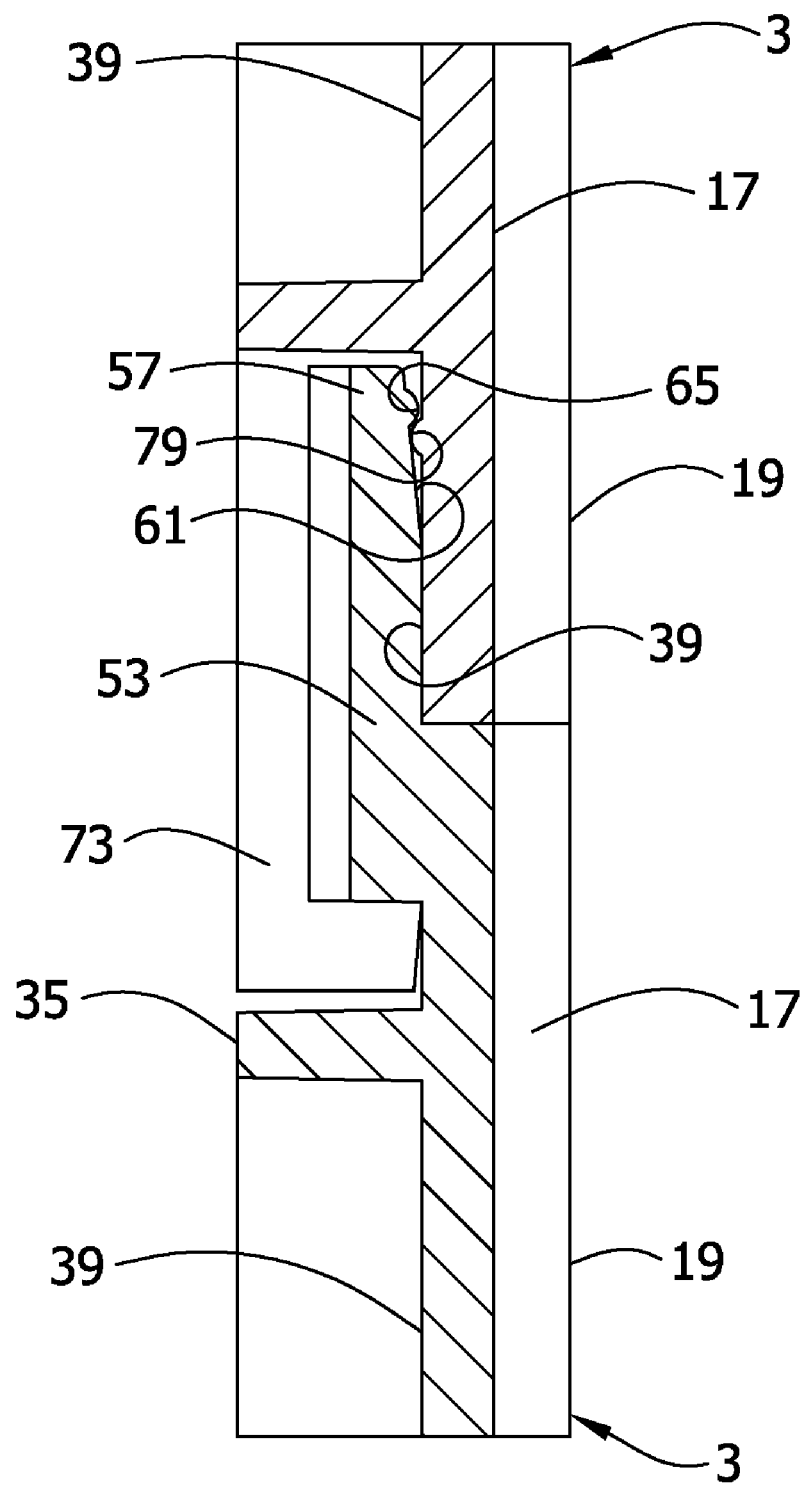
FIG. 10 is an enlarged vertical section on line 10-10 of FIG. 9.
Figure 11:
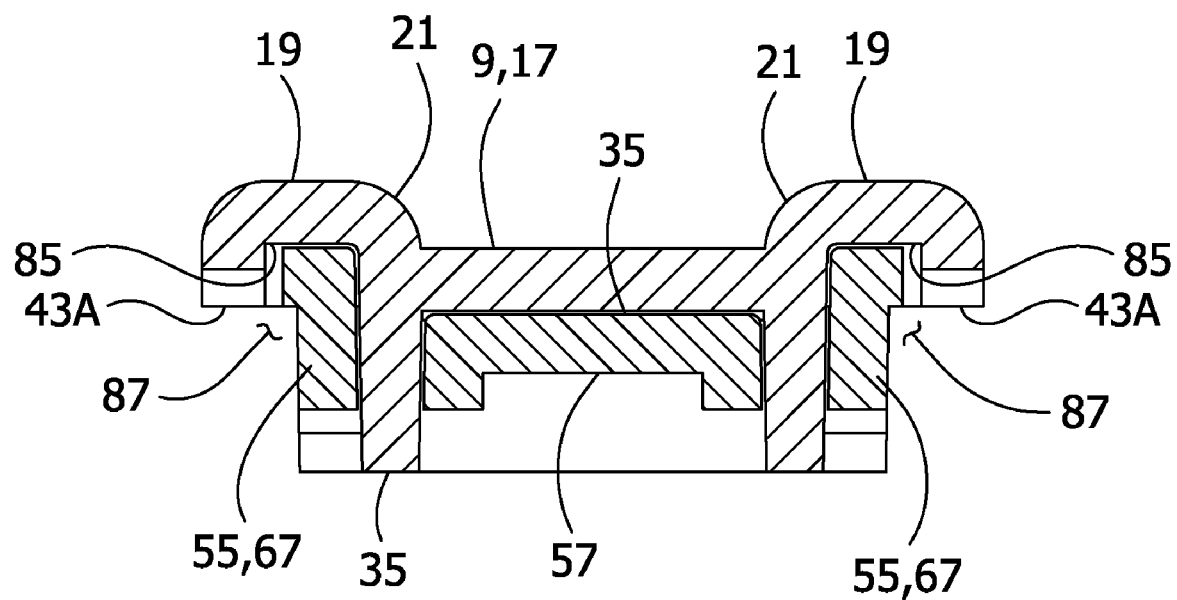
FIG. 11 is an enlarged horizontal section on line 11-11 of FIG. 9.
Figure 12B:
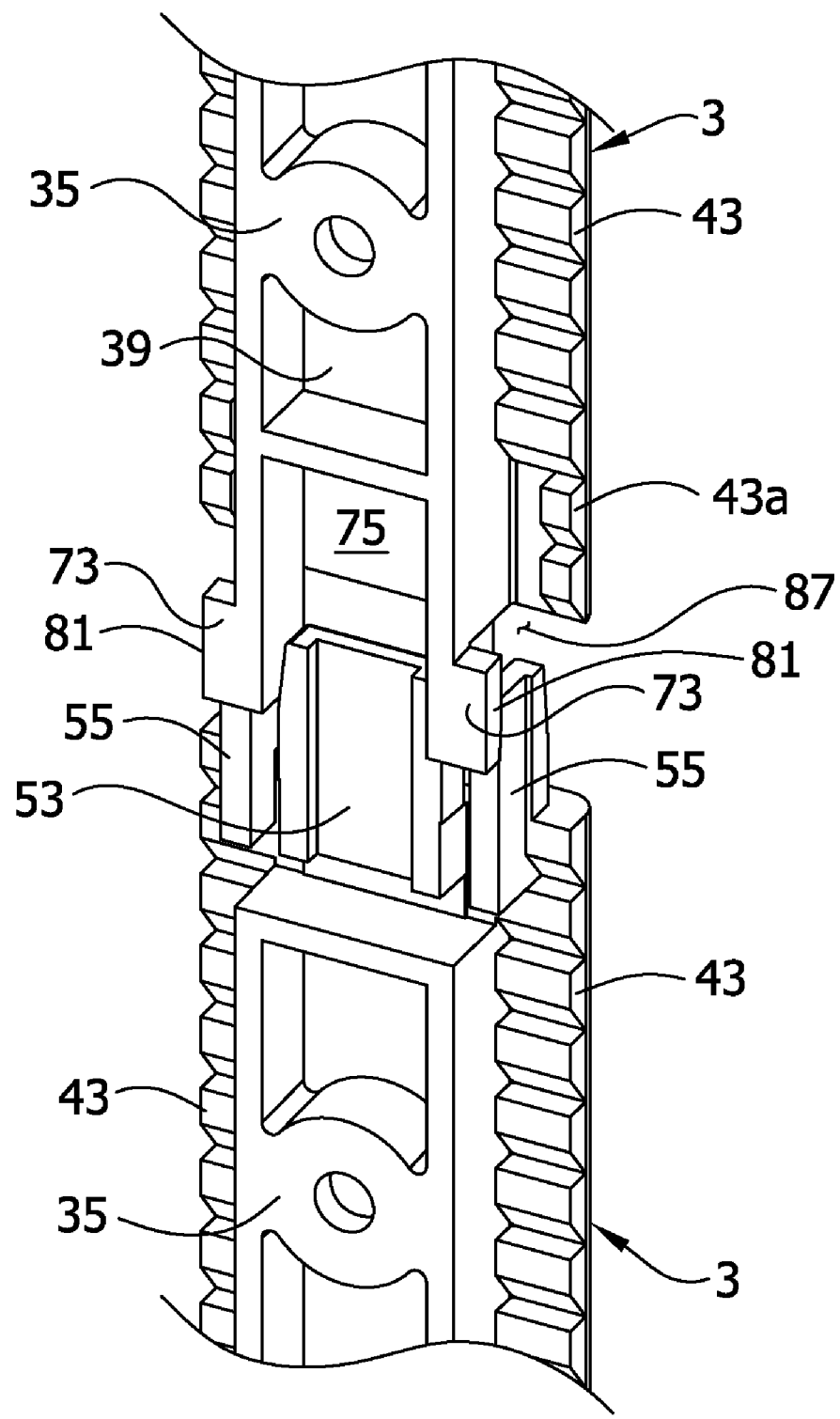
Figure 12C:
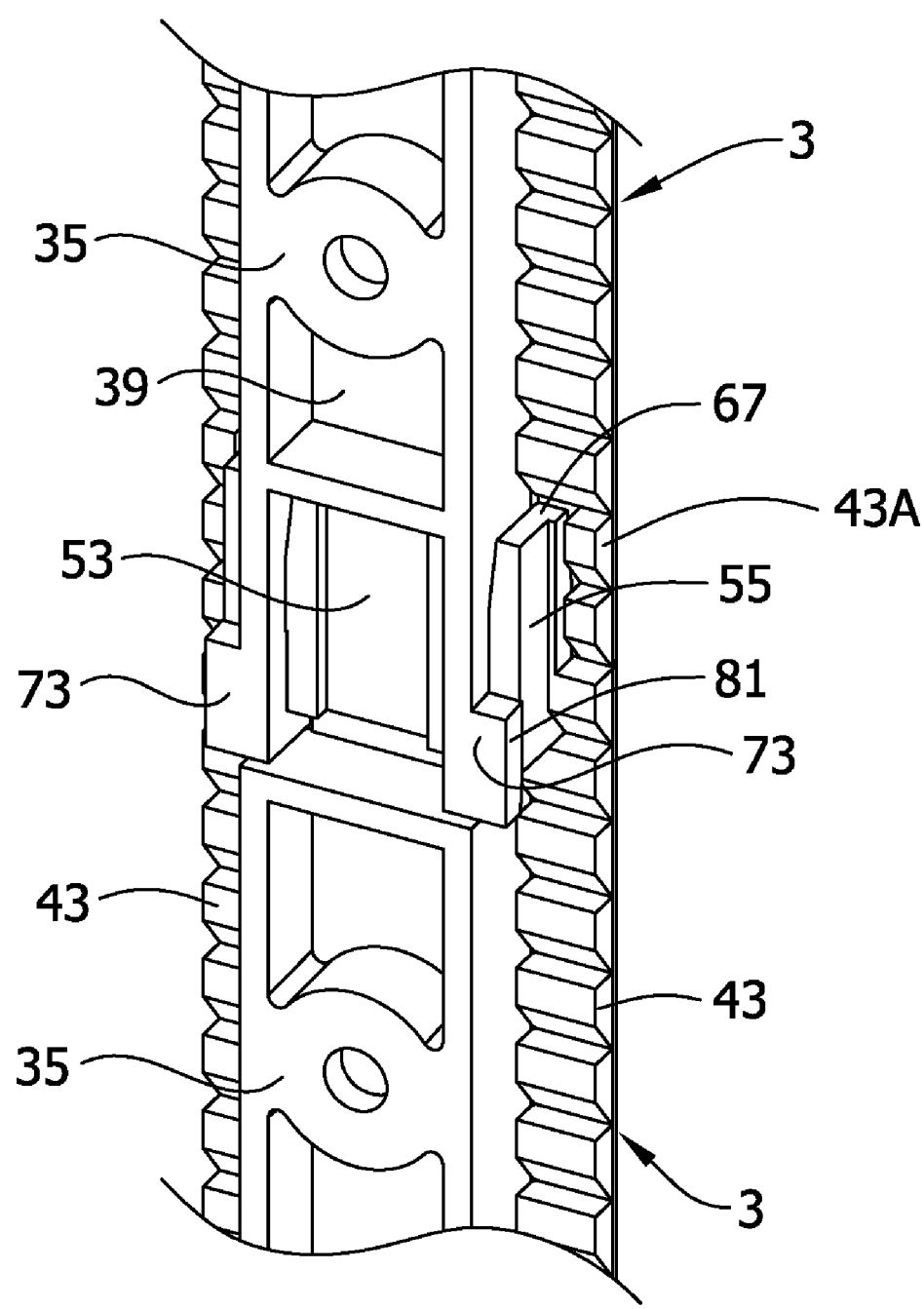
Figure 13:
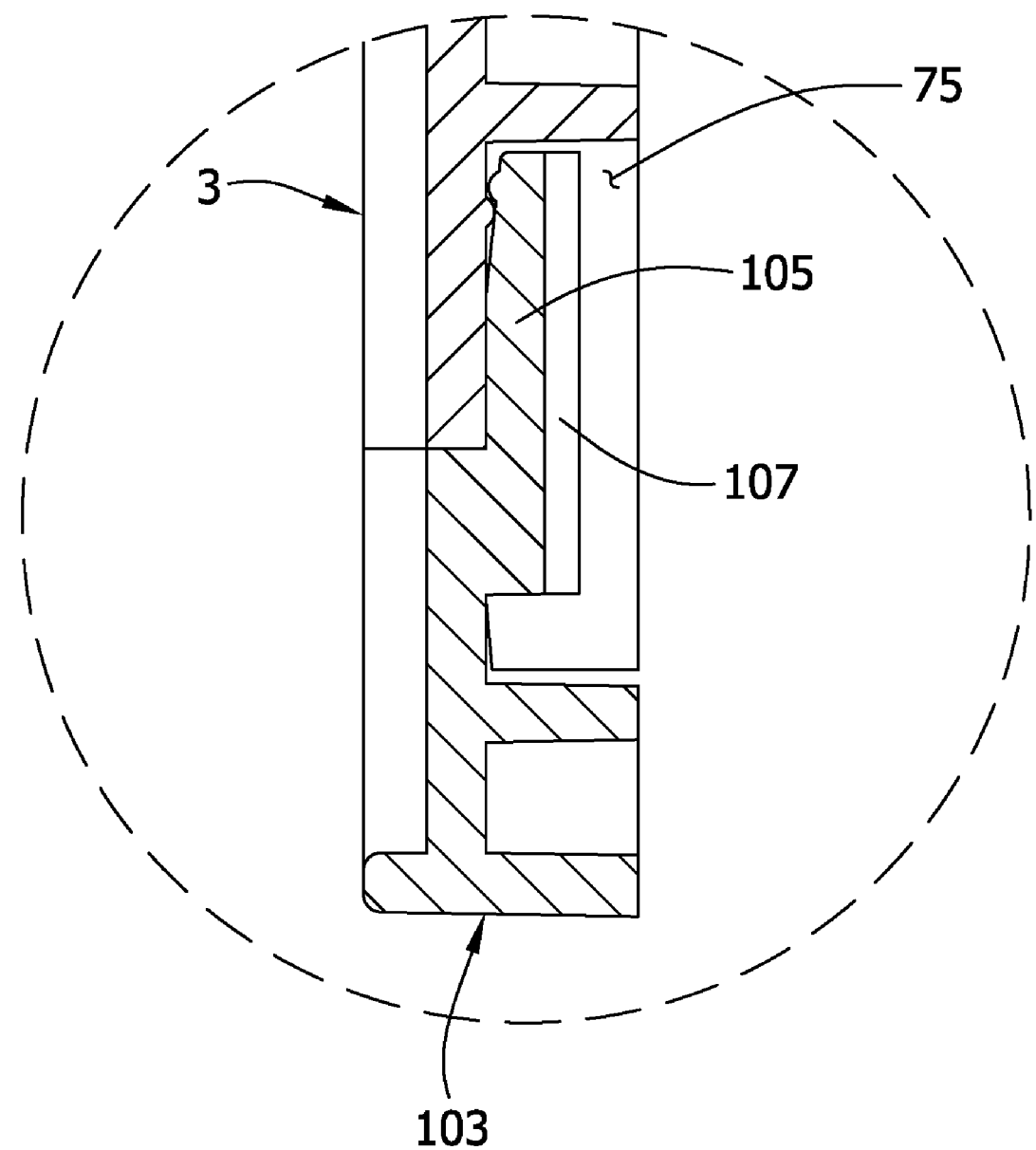
FIG. 13 is an enlarged portion of FIG. 6 showing the fit between a lower cap and the lower end of the rail.
Figure 14:
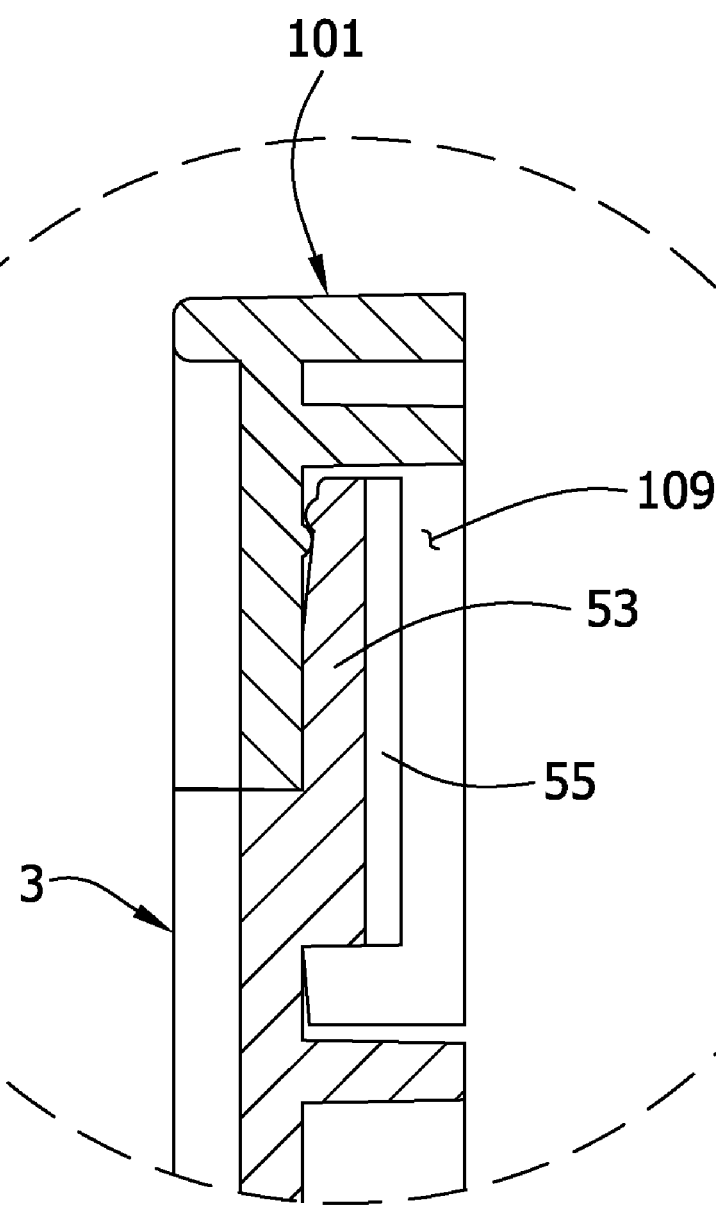
FIG. 14 is an enlarged portion of FIG. 6 showing the fit between an upper cap and the upper end of the rail.

The exposed upper and lower ends 15, 16 of a rail 3 (or rail system 1 if two or more rails 3 are connected as described above) can be capped with upper and lower caps, generally depicted 101 and 103 respectively, which fit over respective ends 15, 16 of the rails 3 to provide a pleasing aesthetic appearance. In the embodiment shown in FIGS. 6 and 13, the lower cap 103 has an end configuration substantially the same as the upper end 15 of the rail 3 described above. That is, the lower cap 103 has a tongue 105 and flanking projections 107 which are received in respective recesses 75 and guide ways 87 at the lower end 16 of the rail 3. Similarly, in the embodiment shown in FIGS. 6 and 14, the upper cap 101 has a configuration substantially the same as the lower end 16 of the rail 3 described above. That is, the upper cap 101 has a recess 109 and guide ways 111 (not shown) for receiving the tongue 53 and flanking projections 55 at the upper end 15 of the rail 3. Other cap configurations are possible. The caps are preferably made out of the same material as the rail(s) 3.

Figure 15:
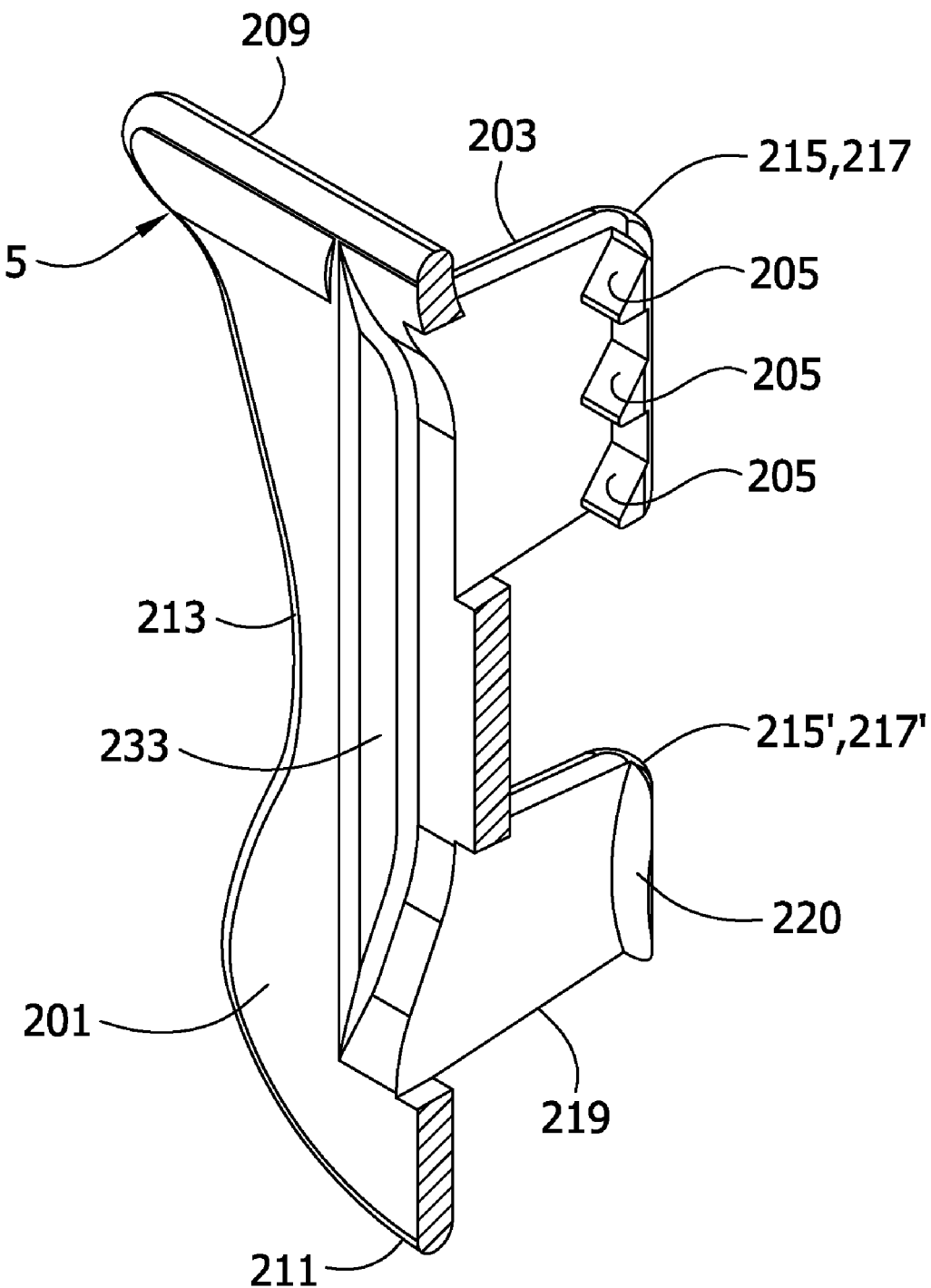
FIG. 15 is a front perspective of the slider of FIG. 1 with a portion of the slider cut away to show detail.

Referring to FIG. 15, the slider 5 comprises a body 201 adapted to be positioned on the front 9 of the rail 3, and at least a first pair of arms 203 at opposite sides of the body 201 having teeth 205 thereon adapted to engage selected teeth 43 on respective tracks 37 of the rail 3. In the embodiment shown in FIGS. 1 and 2, the body 201 of the slider 5 has an upper edge 209, a lower edge 211, and opposite side edges 213 extending generally longitudinally with respect to the rail 3. (Other slider shapes are possible.) The slider 5 is preferably formed of the same material as the rail 3, although this is not essential. The arms 203 extend rearward from opposite sides 213 of the body 201 beyond the tracks 37 on the back 11 of the rail 3. As shown in FIG. 15, the arms 203 have laterally projecting end portions 215 which, in this embodiment, are in-turned inwardly toward one another. These end portions 215 are formed with at least one forward-facing tooth 205, and preferably two or more forward-facing teeth 205 configured to engage a corresponding number of teeth 43 on respective tracks 37 on the back 11 of the rail 3. To facilitate mounting of the slider 5 on the rail 3, as discussed in detail later, the bottom surfaces 217 of the end portions 215 of the arms 203 are convexly curved. In the illustrated embodiment, the slider 5 also includes a second pair of arms 219 toward the lower end 211 of the slider 5. These arms 219 are similar in construction to the first pair of arms 203 except that the laterally projecting end portions 215' are toothless. The end portions 215' have forward-facing surfaces 220 which are flat and adapted for mating sliding contact with the end walls 47 of the teeth 43. Other configurations are possible.

Figure 16:
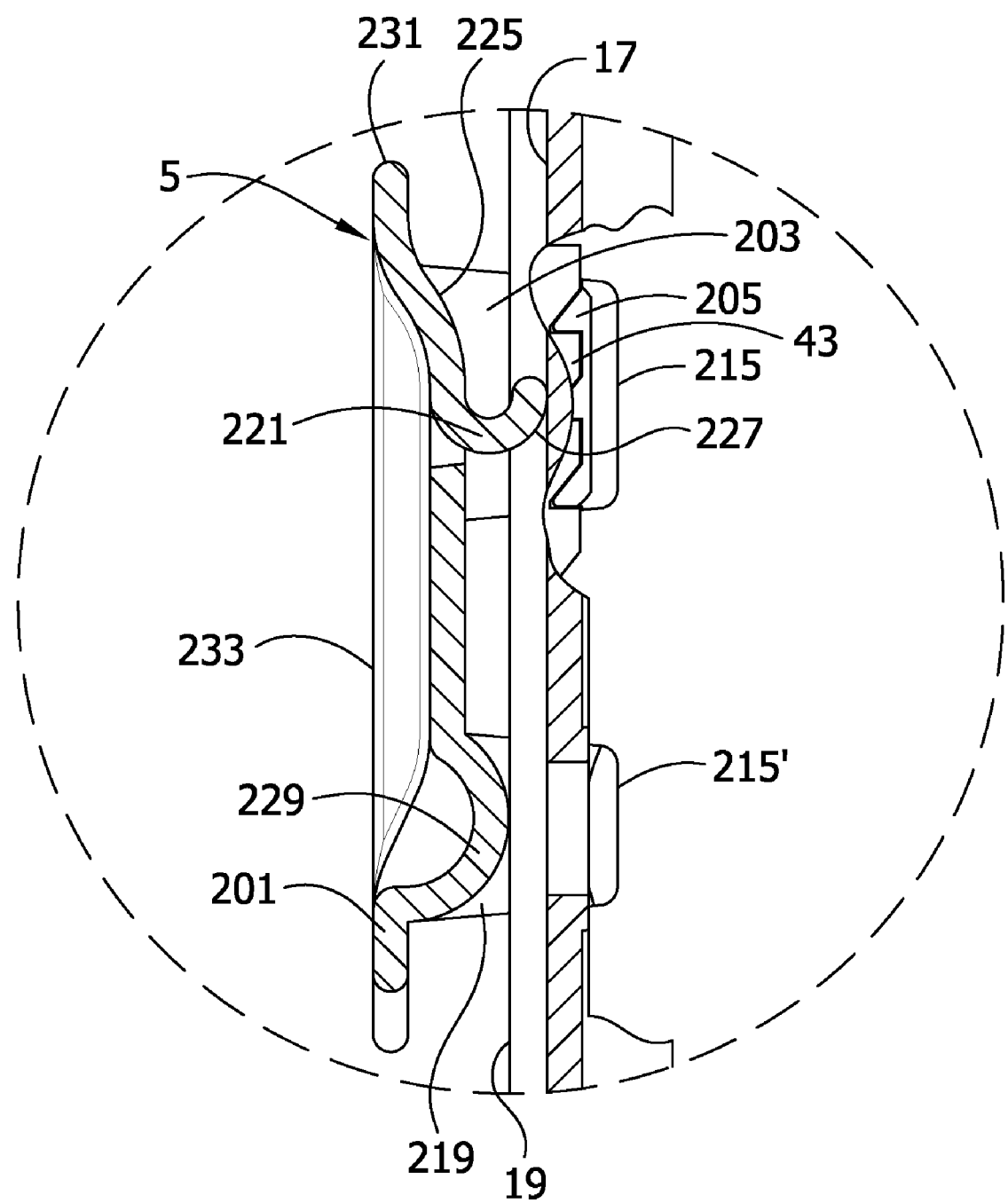
FIG. 16 is an enlarged portion of FIG. 6 showing the slider in a locked position on the rail.
Figure 17:
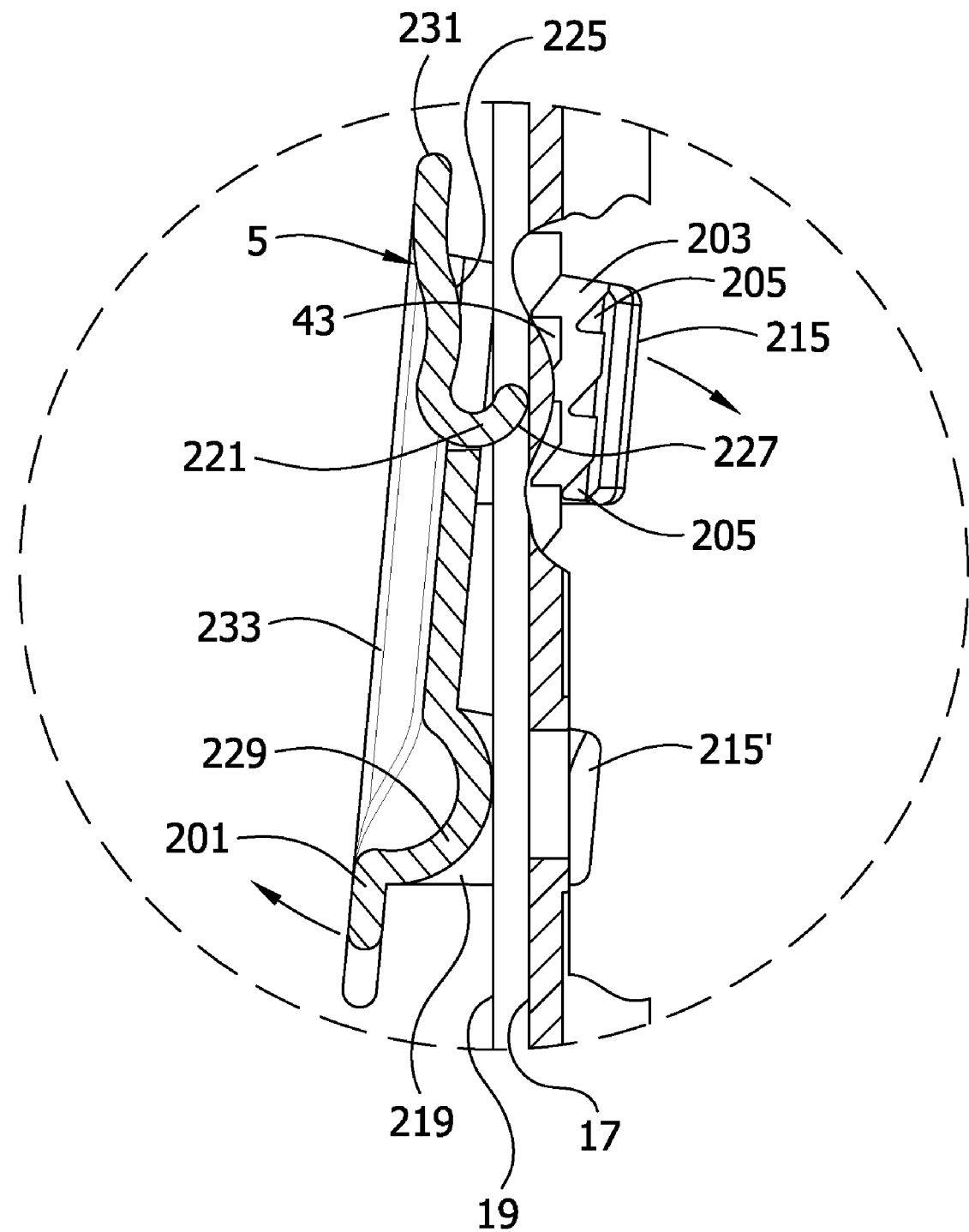
FIG. 17 is a view similar to FIG. 16 but showing the slider in an unlocked position so that it can be slidably moved along the rail to a different position.

As shown best in FIGS. 15-17, the body 201 of the slider 5 is formed with a spring device 221 which is adapted to contact the front face 17 of the rail 3 for urging the body 201 and arms 203, 219 of the slider 5 to move toward a locked position (FIG. 16) in which the teeth 205 on the first (upper) pair of arms 203 are in engagement with respective teeth 43 on the tracks 37, thereby to lock the slider 5 in a selected position along the rail 3. The spring device 221 is desirably a "living" spring integrally formed with the body 201 of the slider 5. In one embodiment, the spring device 221 comprises a cantilever spring member (also designated 221) joined at its upper end 225 to the slider body 201 adjacent the upper end 209 of the body 201. The free (lower) end 227 of the spring member 221 contacts the recessed front face 17 of the rail 3 and urges the slider body 201 toward the stated locked position.

The body 201 of the slider 5 is also formed with a pivot structure or formation 229 toward its lower edge 211 (see FIG. 15-17). The pivot formation 229 comprises, in one embodiment, a curved formation integrally formed with the slider body 201 and having an arcuate outer surface which contacts the shoulders 19 on the front 9 of the rail 3. Unlike the spring member 221, the pivot formation 229 is relatively rigid. It functions as a fulcrum to facilitate pivoting of the slider body 201 between its stated locked position and an unlocked position (FIG. 17) in which the slider body 201 is pushed in a rearward direction against the bias of the spring member 221 to disengage the teeth 205 and 43 on the arms 203 and the tracks 37, respectively. Once the teeth are disengaged, the slider body 201 can be slidably moved along the rail 3 to a different selected position. Upon reaching the selected position, the pushing force on the slider body 201 is released. Upon release, the spring device 221 causes the slider body 201 to move back to its locking position to again lock the slider 5 to the rail 3. A tab 231 projects up from the top edge 209 of the slider body 201 to facilitate the movement of the slider body 201 toward its unlocked position. The slider body 201 is reinforced by a pair of ribs 233 extending along the front face of the body 201 inboard of the side edges 213 of the body.

Figure 18A:
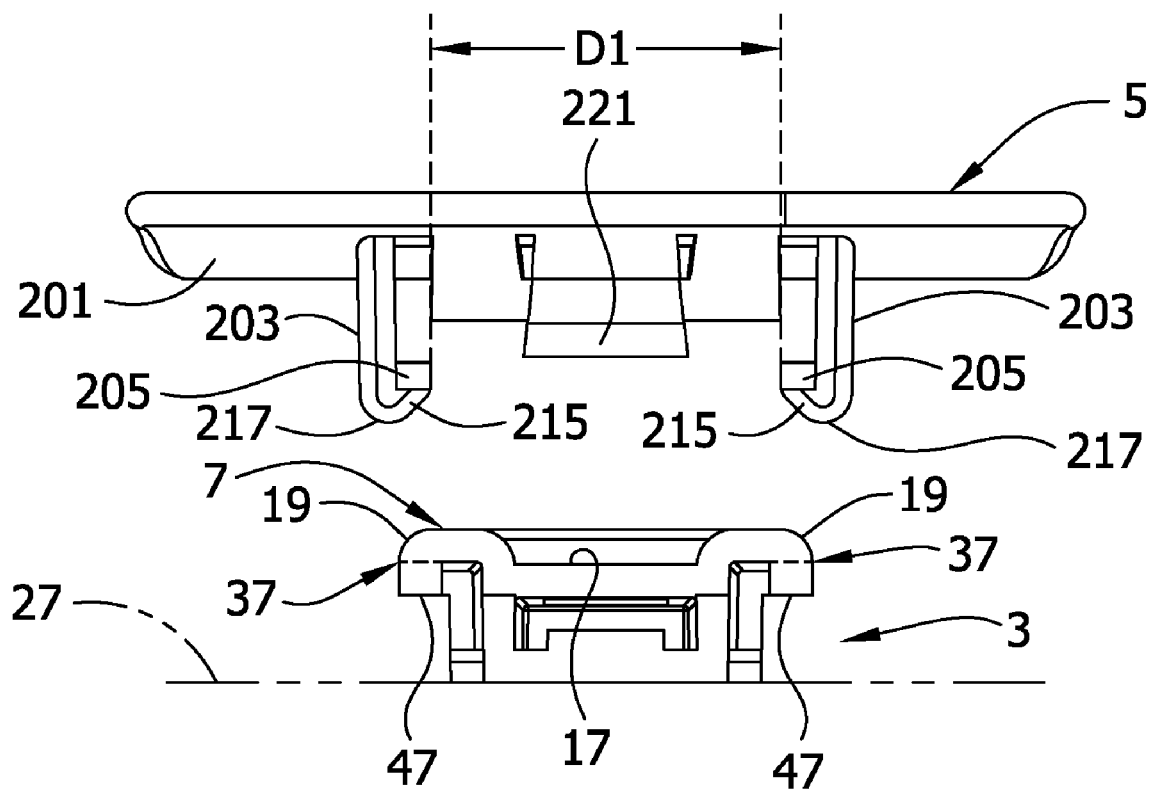
FIGS. 18A-18C is a sequence illustrating how the slider of FIG. 1 can be snap-mounted on the rail.
Figure 18B:
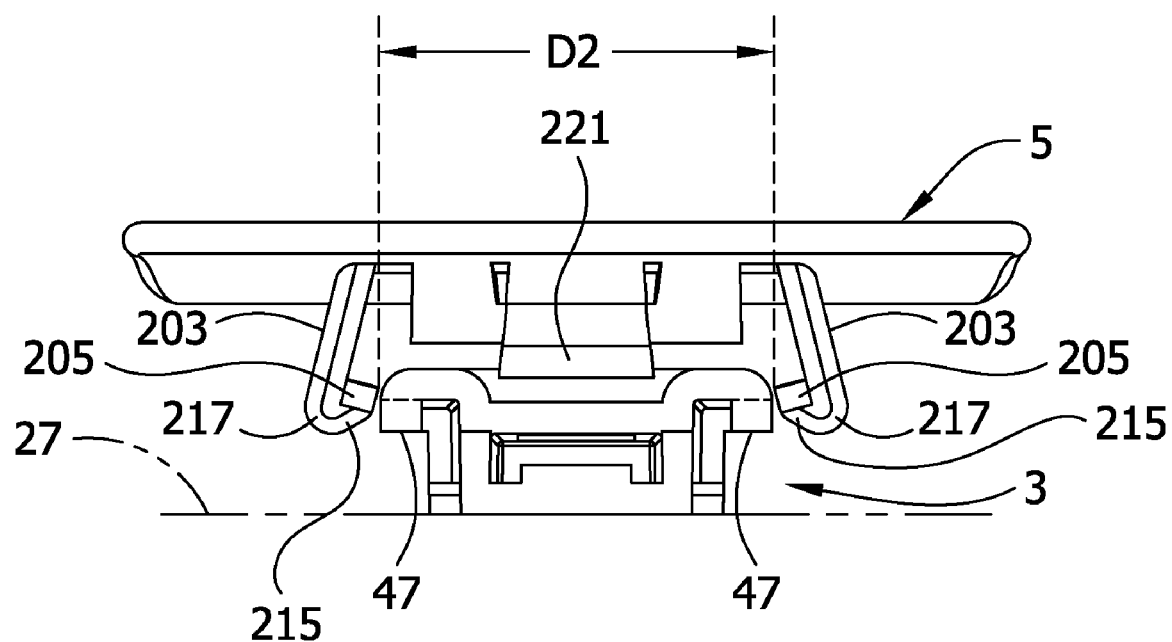
Figure 18C:
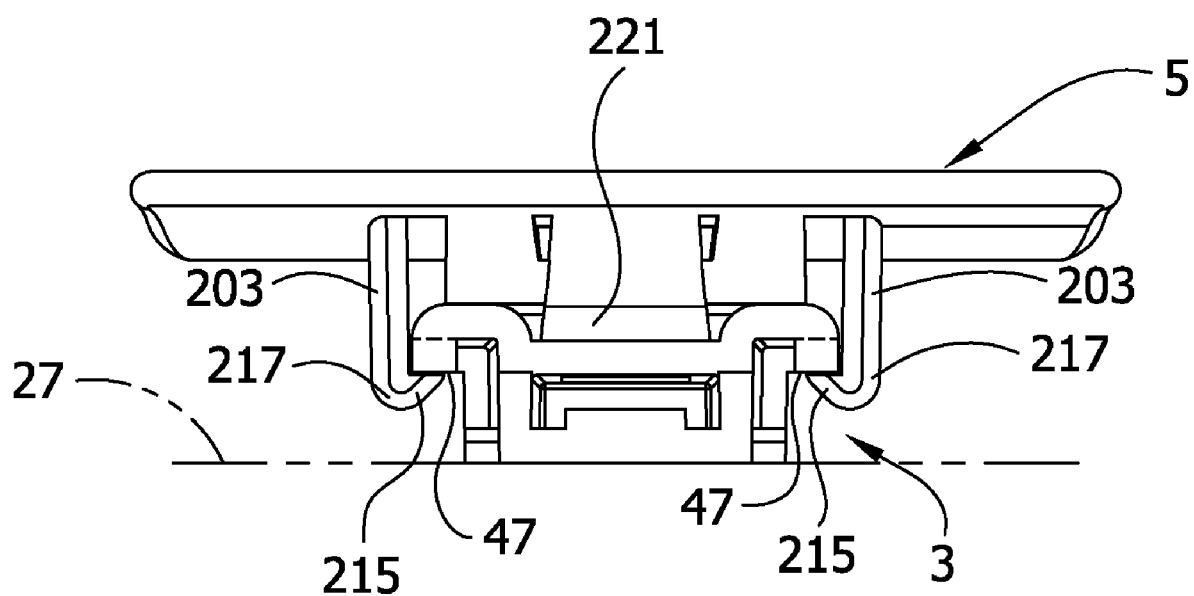

Referring to FIGS. 18A-18C, to facilitate mounting of the slider 5 on the rail 3, the arms 203, 219 are preferably flexibly resilient for snap-mounting the slider 5 to the rail 3 at any location along the length of the rail 3. In other words, the two arms of each of the first (upper) 203 and second (lower) 219 pairs of arms are adapted to resiliently snap from an un-flexed or relaxed condition in which the arms 203, 219 are spaced apart a distance, to a flexed condition in which the two arms 203, 219 are spaced apart a distance sufficient to permit the laterally projecting end portions 215, 215' of the arms 203, 219, respectively, to move rearward past the front 9 and sides 13 of the rail 3, and then back toward the relaxed condition in which the arms 203, 219 are spaced apart a different distance such that the teeth 205 on the arms 203 underlie the tracks 37 and are positioned to engage the teeth 43 on the tracks 37. An exemplary snap-mounting sequence is illustrated in FIGS. 18A-18C. In this sequence, the slider body 201 is positioned at the front 9 of the rail 3 with the arms 203, 219 on opposite sides 213 of the slider body 201 straddling the rail 3. In this position, the arms 203, 219 are un-flexed or relaxed and spaced apart a distance, e.g., D1 in FIG. 18A. The body 201 of the slider 5 is then pushed in a rearward direction (toward the wall 27) to bring the curved bottom surfaces 217, 217' of the end portions 215, 215' of the arms 203, 219 into contact with the rounded shoulders 19 at opposite sides of the rail 3. Applying a rearward force will cause the arms 203, 219 at opposite side 213 of the slider 5 to flex resiliently outward away from one another until the in-turned end portions 215, 215' of the arms 203, 219 are spaced apart a distance (e.g., D2 in FIG. 18B) sufficient to permit them to move past the front 7 and sides 13 of the rail, at which point the resilience of the arms 203, 219 causes the end portions 215, 215' to snap inward toward one another back toward the original relaxed condition to a bring the teeth 205 on the end portions 215 into engagement with the teeth 43 on the tracks 37 (FIG. 18C). Other snap-fastening arrangements are contemplated. For example, the rail 3 may be formed with one or more longitudinal slots in its front face 17, and the arms 203, 219 may be adapted to be flexed resiliently inward toward one another to pass through the slot(s), following which the arms 203, 219 spring outward to a position underlying the teeth 43 on the tracks 37 of the rail 3.

By providing the slider 5 with the snap-mounting feature described above, the slider 5 can be mounted on the rail 3 in a number of different ways. For example, the slider 5 can be mounted from the top 15 of the rail 3 by sliding the slider 5 down endwise on the rail 3; or the slider 5 can be mounted from the bottom 16 of the rail 3 by sliding the slider 5 up endwise on the rail 3; or the slider 5 can be mounted at any location between the top 15 and bottom 16 of the rail 3 by snapping the arms 203, 219 over the sides 13 of the rail 3 as described above. The flexibility provided by this feature is an advantage, especially where more than one slider 5 is used on a rail 3.

Figure 19:
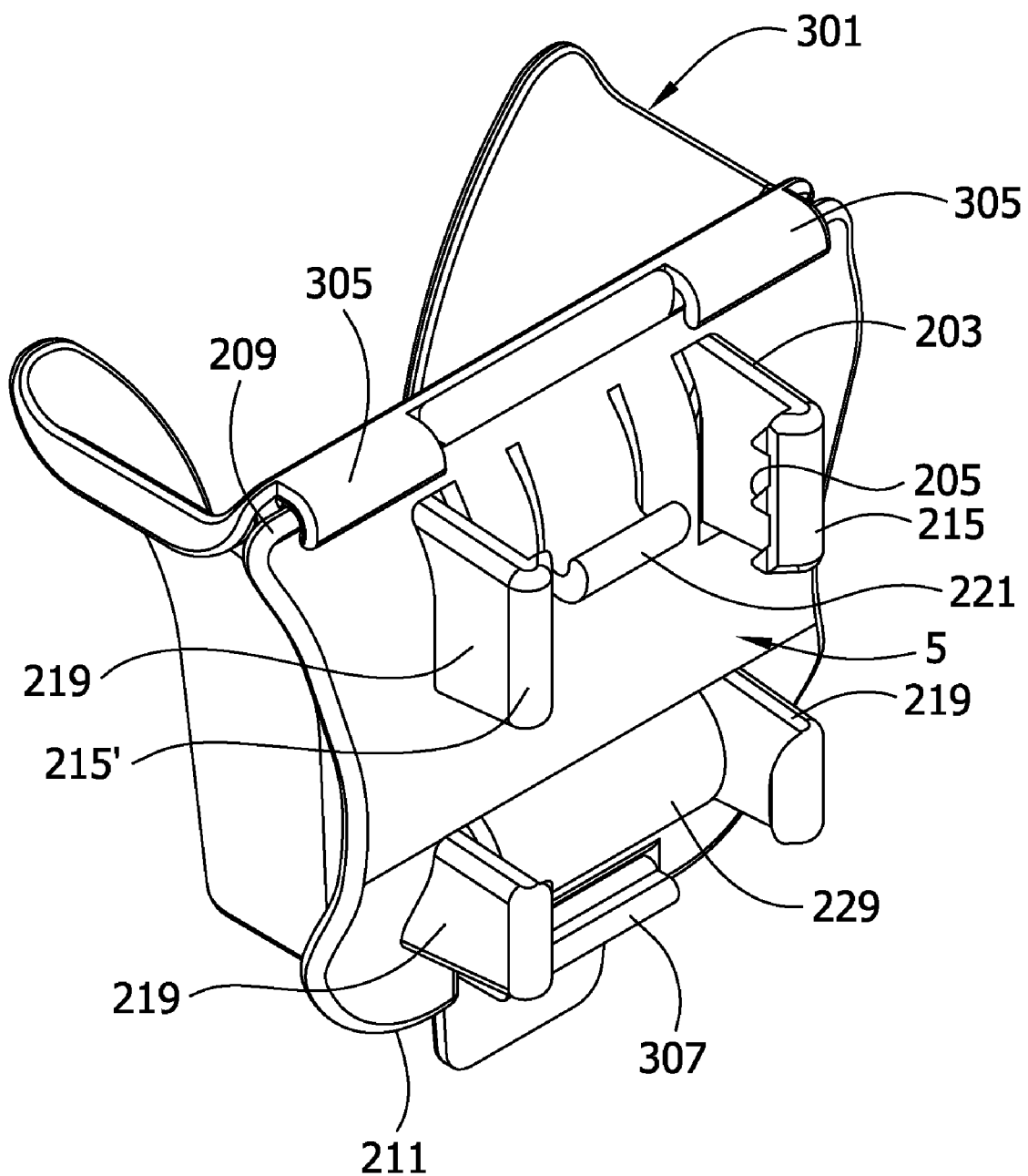
FIG. 19 is a rear perspective of a funnel holder mounted on the slider of FIG. 1.

The rail and slider system 1 described above can be used in many different ways. FIG. 19 illustrates one such way. In this embodiment, an implement holder 301 is mounted on the slider 5, one such holder being a funnel-type holder as described in more detail in my U.S. Pat. No. 6,305,557. In this regard, the slider 5 and implement holder 301 are provided with mating fastening components for fastening the holder 301 to the slider 5. In the embodiment shown in FIG. 19, the implement holder has a pair of top hooks 305 which hook over the upper edge 209 of the slider 5 and a single bottom hook 307 which hooks over the lower edge 211 of the slider 5 to releasably secure the holder to the slider 5. The top and/or bottom hooks 305, 307 may be of a flexibly material to allow the hook 307 or hooks 305 of one set (top or bottom) to be applied first, and the hook 307 or hooks 305 of the other set then to be snapped over a respective edge to lock the implement holder 301 in place. Alternatively, the slider 5 may have openings (e.g., slots) for receiving hook-shaped tabs on the implement holder 301 thereby to releasably secure the holder 301 to the slider 5. Other fastening arrangements using other mating components are contemplated. In any event, releasable securement is advantageous in that different holders or other accessories may be secured to the slider 5, as needed or desired. Alternatively, the slider body 201 and implement holder 301 may be permanently (e.g., integrally) joined.

Figure 20:
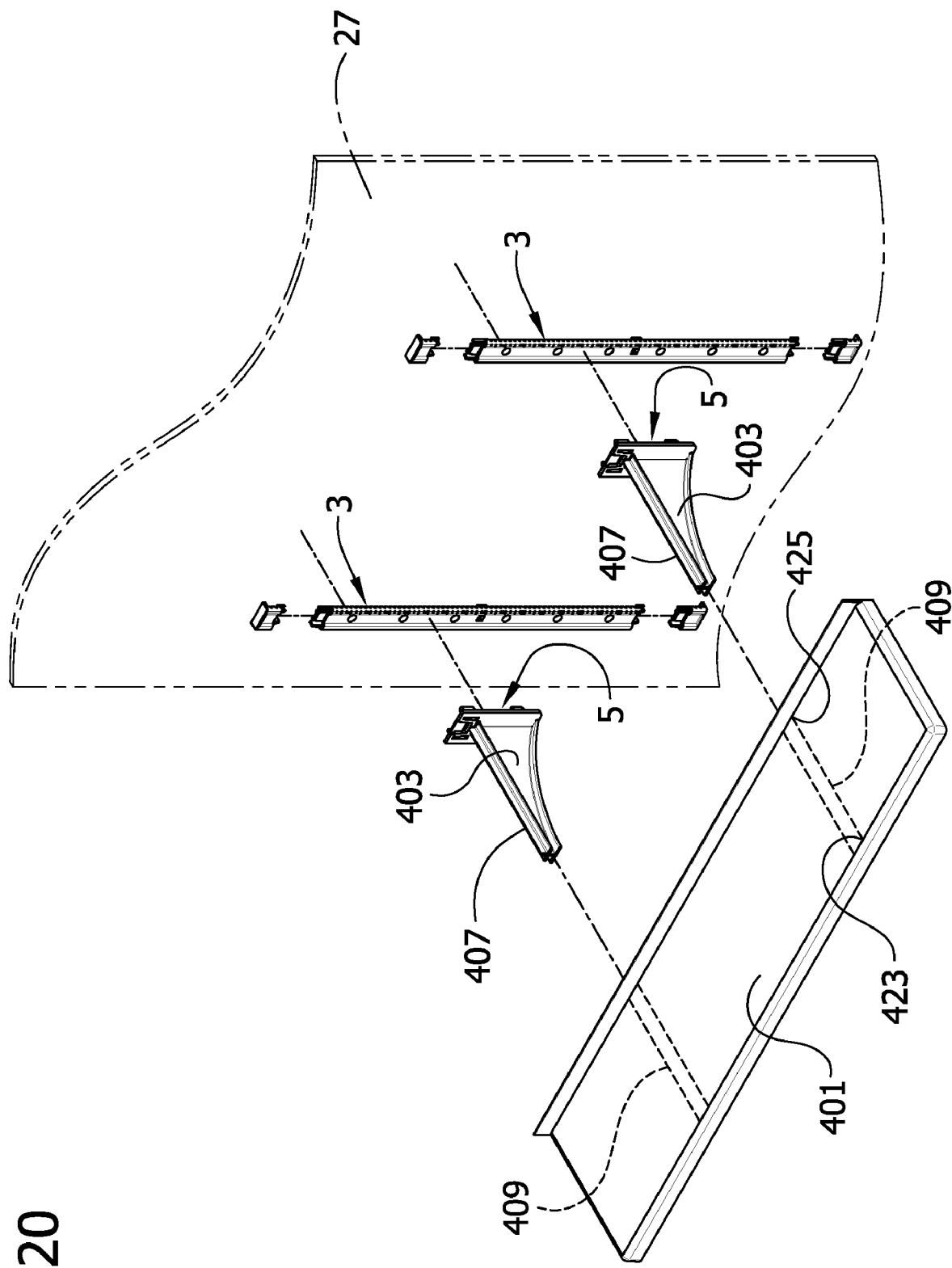
FIG. 20 is an exploded view of a rail and slider system for mounting a shelf on a wall.
Figure 21:
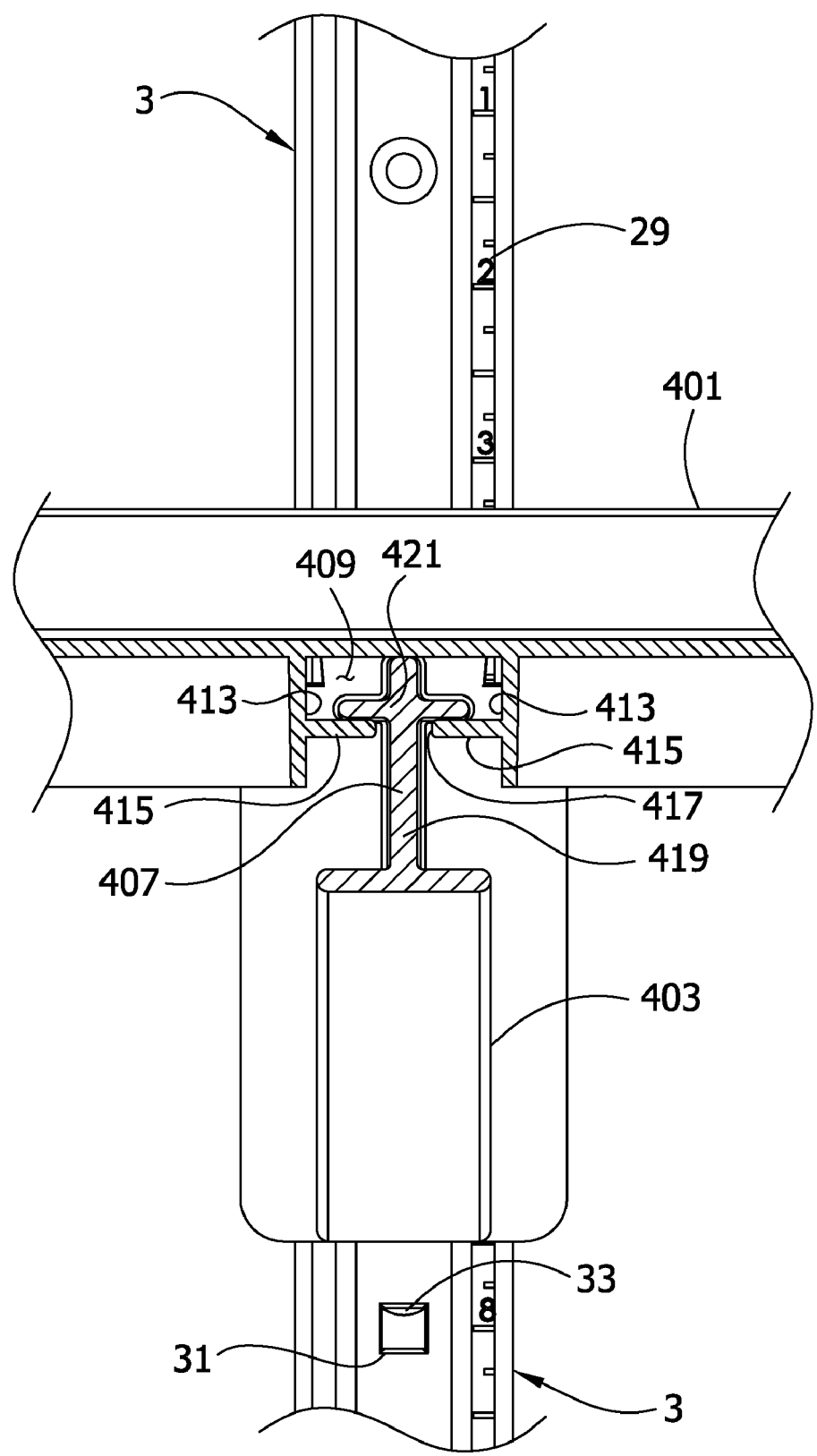
FIG. 21 is a vertical cross section showing the fit of the shelf of FIG. 20 on a bracket mounted on one of the sliders of the system.

Referring to FIG. 20, a rail and slider system 1 of this invention is shown as comprising first and second substantially identical rails 3, constructed as described above, and first and second substantially identical sliders 5, constructed as described above, mounted on the rails 3. The system 1 also includes a shelf 401 and a pair of brackets 403 mounted on the sliders 5 for supporting the shelf 401 in a generally horizontal position. The brackets 403 may be releasably or permanently secured to the sliders 5, as discussed above. As illustrated in FIGS. 20 and 21, each bracket 403 comprises a generally hollow bracket member (also designated 403), preferably formed of the same material as the rail 3 and slider 5 to which it is attached). The bracket member 403 includes a T-shaped rail 407 running along the top of the member 403 for reception in a guide way 409 on the underside of the shelf 401. The guide way 409 is in the form of a channel comprising a pair of opposing flanges 413 with lips 415 spaced apart to define a slot 417 for receiving the vertical leg 419 of the rail 407 on the bracket 403. The head 421 of the rail 407 bridges the slot 417 and engages the lips 415 of the guide way 409 to hold the shelf 401 in substantially fixed lateral and vertical positions relative to the brackets 403. The guide ways 409 on the shelf 401 are closed at their front ends 423 and open at their back ends 425 (i.e., the ends adjacent the rails) to permit the shelf 401 to slide into position on the brackets 403 with the rails 407 received in the guide ways 409 (see FIG. 21). After the shelf 401 is installed on the brackets 403, the shelf 401 can be fastened to the two brackets 403 in a suitable manner to lock the shelf 401 against forward sliding movement on the brackets 403.

Any number of shelves 401 can be mounted on the rails 3 by using an appropriate number of sliders 5. As discussed above, multiple rails 3 can be connected end to end to increase the overall length (e.g., height) of the rail system 1, as needed or desired.

Figure 22:
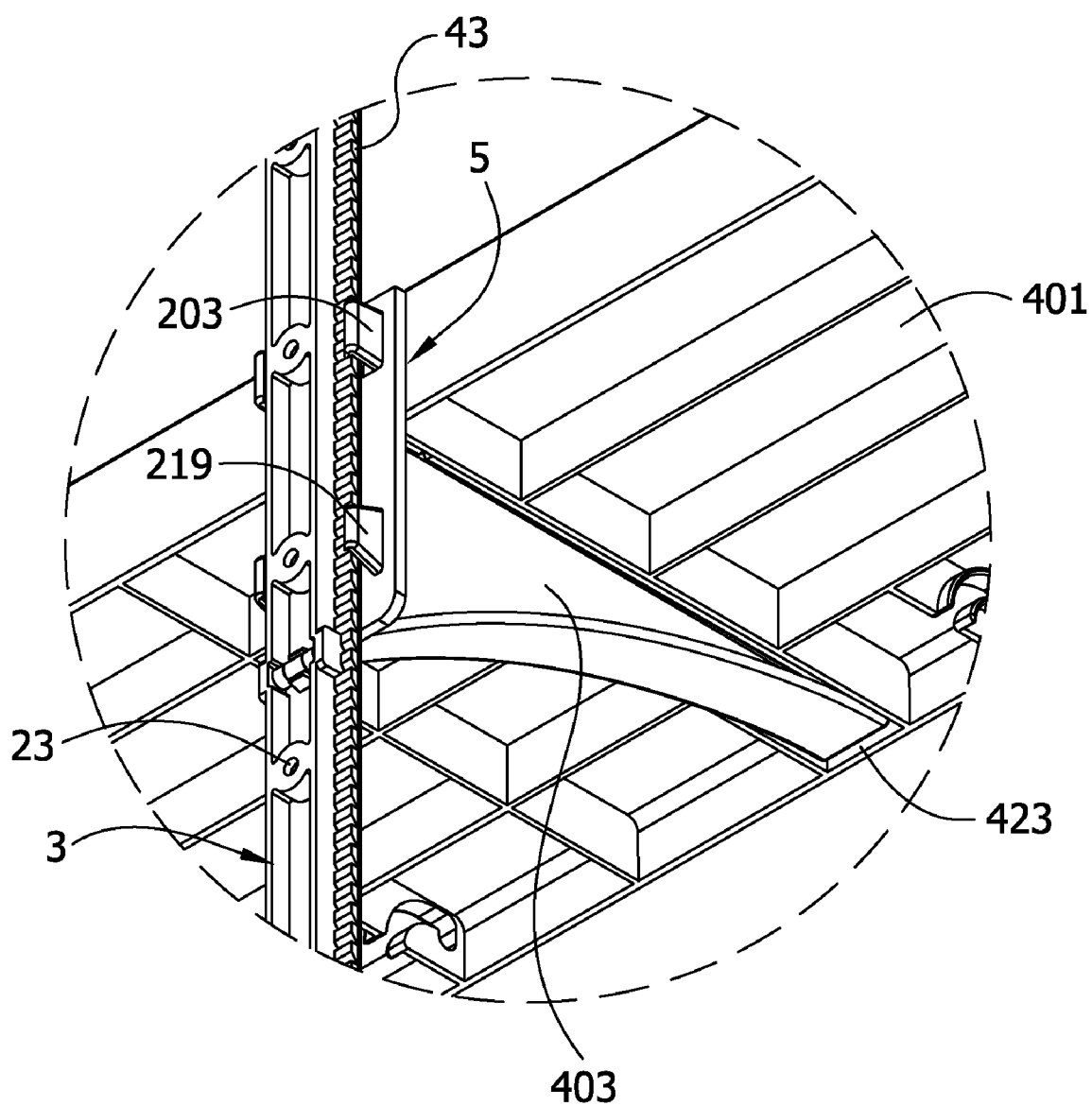
FIG. 22 is a rear perspective showing a slider mounted on a rail and holding a bracket for supporting the shelf of FIG. 21.

To adjust the position of a shelf 401, the front edge of the shelf 401 is simply lifted in an upward direction a relatively small distance sufficient to cause the two slider bodies 201 to pivot from their locked positions to their unlocked positions. The shelf 401 can then be moved to a different position and then released. Once the shelf 401 is released, the slider bodies 201 will pivot under the weight of the shelf 401 and the urging of their respective spring devices 221 back to their locked position in which the teeth 205 on the arms 203 of the sliders 5 engage the teeth 43 on the tracks 37 (see FIG. 22).

Figure 23:
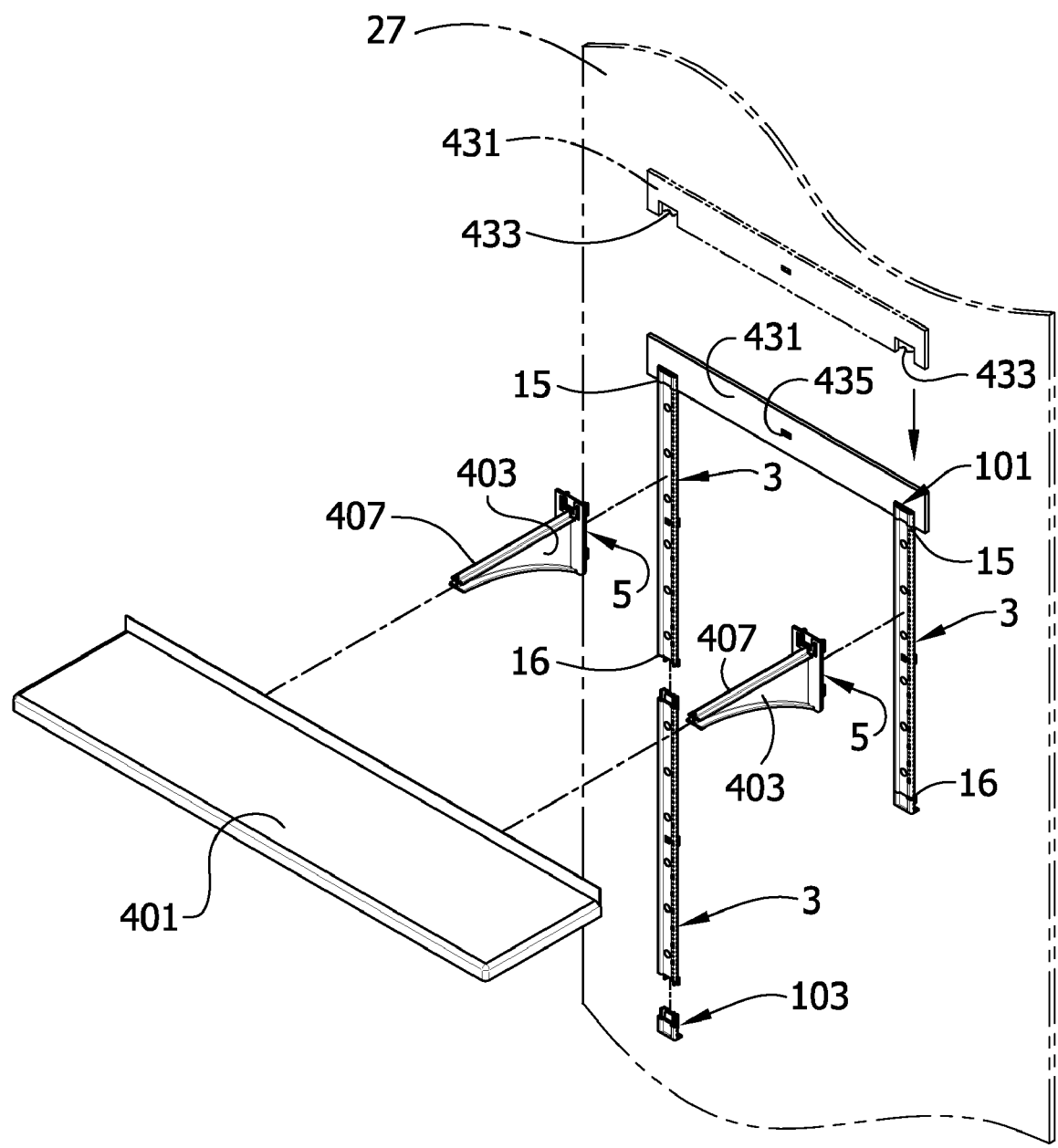
FIG. 23 is a view similar to FIG. 20 but showing how multiple rails can be telescoped together to increase the height of the system, and how a template can be used to mount the system on a wall.

FIG. 23 illustrates a kit of this invention which includes at least two rails 3 and at least two sliders 5 as described above. The kit may also include holding implements 301, brackets 403, one or more shelves 401, other accessories to be mounted on the sliders 5 (e.g., jar and jar holders, hose holders, bike holders, and other items described in more detail in my aforesaid published application incorporated herein by reference), or various combinations of brackets 403, holding implements 301, and/or other accessories. In addition, a template 431 is provided in the kit to facilitate mounting of two rails 3 in proper position relative to one another. The template 431 is formed from a suitable substrate (e.g, a panel of cardboard, plastic or other rigid or semi-rigid material). As illustrated, it is generally rectangular in shape (other shapes are possible), having a top edge, a bottom edge and opposite side edges. A pair of openings 433 in the form of notches 433 extends up from the lower edge of the template 431. The notches 433 have a size and shape which match the size and shape of the ends 15, 16 of the two rails 3, and the notches 433 are spaced apart a distance corresponding to the proper spacing between the rails 3 as used in a particular application (e.g., for shelving). The template also includes a level 435 for indicating the orientation of the template 431 relative to horizontal.

To install the system provided in the kit, a first rail 3 is secured to a wall 27 or other surface at a suitable location, using the level 435 on the rail 3 to insure that the rail 3 is vertical. The template 431 is then placed flat on the wall 27 with either the upper 15 or lower end 16 of the rail 3 received in one of the two openings 433 in template 431, as shown in FIG. 23. After using the template level 435 to make certain the template 431 is horizontal, the appropriate end of a second rail 3 is placed in the other opening 433 in the template 431 so that the second rail 3 extends parallel to the first rail 3. The second rail 3 is then also secured to the wall 27, using the level 435 on the rail 3 to make certain it is vertical. Using the template 431 in this manner insures that the rails 3 are paced the proper distance from one another and also that they are properly positioned longitudinally (vertically in this case) relative to one another. The scales 29 (see FIG. 21) on the rails 3 can be used to position the sliders 5 on the rails 3 at identical vertical positions so that the shelf or shelves 401 supported by the brackets 403 on the sliders 5 are perfectly horizontal, or close to it.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:
1. A rail and slider system comprising
   at least one rail having a longitudinal axis, a front, a back, opposite sides extending longitudinally of the rail, a top and a bottom, said rail being adapted to be mounted on a wall or other mounting surface with the back of the rail facing the wall,
   a pair of generally parallel spaced-apart tracks extending longitudinally of the rail adjacent opposite sides of the rail, said tracks having teeth spaced at intervals along the tracks, and a slider mounted on the rail for sliding movement along the rail, said slider comprising a body positioned on the front of the rail, at least a first pair of arms at opposite sides of the body having teeth thereon engaging selected teeth on respective tracks of the rail, the teeth on the arms being fixed and immovable with respect to the arms and the teeth on the tracks of the rail being fixed and immovable with respect to the rail, and a spring device on the body contacting the rail for urging the body and arms of the slider to move relative to the rail toward a locked position in which the fixed and immovable teeth on the arms are in engagement with respective fixed and immovable teeth on the tracks to lock the slider in a selected position along said rail, said body being manually movable against the urging of said spring device from said locked position to an unlocked position in which the fixed and immovable teeth on the arms and the fixed and immovable teeth on the tracks are disengaged to permit sliding movement of the slider along the rail to a different selected position whereupon the spring device, upon release of the body, causes the body and arms of the slider to move relative to the rail back to said locked position thereby to lock the slider to the rail in said different selected position.

2. A system as set forth in claim 1 wherein said teeth on the tracks face in a rearward direction and said teeth on said arms face in a forward direction.

3. A system as set forth in claim 2 wherein said arms extend in a rearward direction from said slider body beyond said tracks, said arms having laterally projecting end portions formed with said teeth.

4. A system as set forth in claim 1 further comprising a level on said rail for orienting said rail when mounting it on said wall.

5. A system as set forth in claim 1 wherein said rail is a first rail and said system includes at least a second rail substantially identical to the first rail, said first and second rails having ends configured for a telescoping fit with one another to provide a rail system of greater length.

6. A system as set forth in claim 1 further comprising caps for capping the ends of said rail.

7. A system as set forth in claim 1 further comprising an implement holder, said slider and implement holder having mating fastening components for fastening said holder to the slider.

8. A system as set forth in claim 1 wherein said rail is a first rail adapted to be mounted in a generally vertical position on said wall, and wherein said slider is a first slider, said system further comprising a second rail substantially identical to said first rail adapted to be mounted generally parallel to said first rail, a second slider substantially identical to said first slider adapted to slide along said second rail, a shelf, and a pair of brackets on said sliders for supporting said shelf at a selected vertical elevation.

9. A rail and slider system comprising at least one rail having a longitudinal axis, a front, a back, opposite sides extending longitudinally of the rail, a top and a bottom, said rail being adapted to be mounted on a wall or other mounting surface with the back of the rail facing the wall, a pair of generally parallel spaced-apart tracks extending longitudinally of the rail adjacent opposite sides of the rail, said tracks having teeth spaced at intervals along the tracks, and a slider mounted on the rail for sliding movement along the rail, said slider comprising a body positioned on the front of the rail, at least a first pair of arms at opposite sides of the body having teeth thereon engaging selected teeth on respective tracks of the rail, the teeth on the arms being fixed and immovable with respect to the arms and the teeth on the tracks of the rail being fixed and immovable with respect to the rail, and a spring device on the body contacting the rail for urging the body and arms of the slider to move relative to the rail toward a locked position in which the fixed and immovable teeth on the arms are in engagement with respective fixed and immovable teeth on the tracks to lock the slider in a selected position along said rail, said body being manually movable against the urging of said spring device from said locked position to an unlocked position in which the fixed and immovable teeth on the arms and the fixed and immovable teeth on the tracks are disengaged to permit sliding movement of the slider along the rail to a different selected position whereupon the spring device, upon release of the body, causes the body and arms of the slider to move relative to the rail back to said locked position thereby to lock the slider to the rail in said different selected position, wherein said slider body comprises a pivot formation contacting said front of the rail to permit pivoting of the body and arms of the slider between said locked and unlocked positions.

10. A system as set forth in claim 9 wherein said spring device comprises a resilient spring member formed as one piece with said body on a rear surface of the body, said spring member contacting the front of the rail and for urging said body away from said front of the rail.

11. A rail and slider system comprising at least one rail having a longitudinal axis, a front, a back, opposite sides extending longitudinally of the rail, a top and a bottom, said rail being adapted to be mounted on a wall or other mounting surface with the back of the rail facing the wall, a pair of generally parallel spaced-apart tracks extending longitudinally of the rail adjacent opposite sides of the rail, said tracks having teeth spaced at intervals along the tracks, and a slider mounted on the rail for sliding movement along the rail, said slider comprising a body positioned on the front of the rail, at least a first pair of arms at opposite sides of the body having teeth thereon engaging selected teeth on respective tracks of the rail, the teeth on the arms being fixed and immovable with respect to the arms and the teeth on the tracks of the rail being fixed and immovable with respect to the rail, and a spring device on the body contacting the rail for urging the body and arms of the slider to move relative to the rail toward a locked position in which the fixed and immovable teeth on the arms are in engagement with respective fixed and immovable teeth on the tracks to lock the slider in a selected position along said rail, said body being manually movable against the urging of said spring device from said locked position to an unlocked position in which the fixed and immovable teeth on the arms and the fixed and immovable teeth on the tracks are disengaged to permit sliding movement of the slider along the rail to a different selected position whereupon the spring device, upon release of the body, causes the body and arms of the slider to move relative to the rail back to said locked position thereby to lock the slider to the rail in said different selected position, wherein said teeth on the tracks face in a rearward direction and said teeth on said arms face in a forward direction, wherein said arms extend in a rearward direction from said slider body beyond said tracks, said arms having laterally projecting end portions formed with said teeth, and a second pair of arms on said body extending in a rearward direction from said slider body beyond said tracks, said second pair of arms having laterally projecting end portions engaging said tracks but having no teeth thereon.

12. A rail and slider system comprising at least one rail having a longitudinal axis, a front, a back, opposite sides extending longitudinally of the rail, a top and a bottom, said rail being adapted to be mounted on a wall or other mounting surface with the back of the rail facing the wall, a pair of generally parallel spaced-apart tracks extending longitudinally of the rail on the back of the rail, said tracks having teeth spaced at intervals along the tracks, and a slider adapted to be mounted on the rail for sliding movement along the rail, said slider comprising a body positioned on the front of the rail, and at least a first pair of arms at opposite sides of the body having teeth thereon engaging selected teeth on respective tracks of the rail, said arms being flexibly resilient for snap-mounting the slider on the rail, wherein said arms have laterally projecting end portions with said teeth thereon, said arms being adapted to resiliently snap from a flexed condition in which the arms are spaced apart a distance sufficient to permit the laterally projecting end portions of the arms to move rearward past the front of the rail, to a more relaxed condition in which the teeth on the arms underlie respective tracks for engagement with the teeth on the tracks.

13. A system as set forth in claim 12 wherein said laterally projecting end portions of the arms are in-turned toward one another.

14. A system as set forth in claim 12 further comprising a second pair of arms on said body having laterally projecting end portions engaging said tracks but having no teeth thereon.

15. A system as set forth in claim 12 wherein said rail is a first rail adapted to be mounted in a generally vertical position on said wall, and wherein said slider is a first slider, said system further comprising a second rail substantially identical to said first rail adapted to be mounted generally parallel to said first rail, a second slider substantially identical to said first slider adapted to slide along said second rail, a shelf, and a pair of brackets on said sliders for supporting said shelf at a selected vertical elevation.

16. A rail and slider system comprising at least one rail having a longitudinal axis, a front, a back, opposite sides extending longitudinally of the rail, a top and a bottom, said rail being adapted to be mounted on a wall or other mounting surface with the back of the rail facing the wall, a pair of generally parallel spaced-apart tracks extending longitudinally of the rail on the back of the rail, said tracks having teeth spaced at intervals along the tracks, and a slider adapted to be mounted on the rail for sliding movement along the rail, said slider comprising a body positioned on the front of the rail, and at least a first pair of arms at opposite sides of the body having teeth thereon engaging selected teeth on respective tracks of the rail, said arms being flexibly resilient for snap-mounting the slider on the rail, wherein said slider is spring biased away from the front of the rail for urging the body and arms of the slider to move toward a locked position in which the teeth on the arms are in engagement with respective teeth on the tracks to lock the slider in a selected position along said rail, said body being manually movable against the urging of said spring bias from said locked position to an unlocked position in which the teeth on the arms and the tracks are disengaged to permit sliding movement of the slider along the rail to a different selected position whereupon the spring bias is adapted, upon release of the body, to move said slider back to said locking position thereby to lock the slider to the rail in said different selected position, the teeth on the arms being fixed and immovable with respect to the arms and the teeth on the tracks of the rail being fixed and immovable with respect to the rail.

* * * * *